US012750917B2

(12) United States Patent
Hong et al.

(10) Patent No.: US 12,750,917 B2
(45) Date of Patent: Sep. 29, 2026

(54) METHOD AND DEVICE FOR SIGNALING OF DRX CONFIGURATION

(71) Applicants: HYUNDAI MOTOR COMPANY, Seoul (KR); KIA CORPORATION, Seoul (KR); WONKWANG UNIVERSITY CENTER FOR INDUSTRY-ACADEMY COOPERATION, Iksan-si (KR)

(72) Inventors: Ui Hyun Hong, Hwaseong-si (KR); Gene Back Hahn, Hwaseong-si (KR); Hyuk Min Son, Iksan-si (KR)

(73) Assignees: Hyundai Motor Company, Seoul (KR); Kia Corporation, Seoul (KR); Wonkwang University Center For Industry-Academy Cooperation, Iksan-si (KR)

( * ) Notice: Subject to any disclaimer, the term of this patent is extended or adjusted under 35 U.S.C. 154(b) by 298 days.

(21) Appl. No.: 18/427,355

(22) Filed: Jan. 30, 2024

(65) Prior Publication Data

US 2024/0188179 A1 Jun. 6, 2024

Related U.S. Application Data

(63) Continuation-in-part of application No. PCT/KR2022/011212, filed on Jul. 29, 2022.

(30) Foreign Application Priority Data

Aug. 4, 2021 (KR) ........................ 10-2021-0102759

(51) Int. Cl.
*H04W 76/28* (2018.01)
*H04W 72/40* (2023.01)
*H04W 92/18* (2009.01)

(52) U.S. Cl.
CPC ........... *H04W 76/28* (2018.02); *H04W 72/40* (2023.01); *H04W 92/18* (2013.01)

(58) Field of Classification Search
CPC ...... H04W 76/28; H04W 72/40; H04W 92/18
(Continued)

(56) References Cited

U.S. PATENT DOCUMENTS 12,396,056 B2 * 8/2025 Wang ................ H04W 52/0229
12,538,381 B2 * 1/2026 Buthler ............. H04W 28/0268
(Continued)

FOREIGN PATENT DOCUMENTS

WO 2021/119474 A1 6/2021

OTHER PUBLICATIONS

International Search Report dated Oct. 24, 2022 cited in International Patent Application No. PCT/KR2022/011212 (w/English translation).

(Continued)

*Primary Examiner* — Albert Kir
(74) *Attorney, Agent, or Firm* — Morgan Lewis & Bockius LLP

(57) ABSTRACT

In a method and device for signaling of DRX configuration, the method for a first UE includes the steps of: receiving, from a second UE, signaling message #1 including second Uu DRX configuration information for a second Uu link between the second UE and a second base station; reconfiguring SL DRX configuration information for an SL DRX operation in consideration of the second Uu DRX configuration information, such that the SL DRX operation for SL between the first UE and the second UE and a second Uu DRX operation for the second Uu link are aligned; and transmitting, to the second UE, signaling message #2 including the reconfigured SL DRX configuration information.

19 Claims, 16 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2021/0227620 | A1 | 7/2021 | Pan et al. | |
| 2025/0393099 | A1 * | 12/2025 | Selvanesan | H04W 76/28 |
| 2026/0006680 | A1 * | 1/2026 | Wang | H04W 76/28 |

OTHER PUBLICATIONS

Convida Wireless, "SL DRX Configuration: TX Centric or RX Centric," 3GPP TSG-RAN WG2 Meeting #114 electronic, Online Meeting—May 19-27, 2021, R2-2106364.
Oppo, "Discussion on network involvement for SL related DRX," 3GPP TSG-RAN WG2 #114-e, E-meeting—May 2021, R2-2104769.
Samsung, "Coordination between DL DRX and SL DRX," 3GPP TSG RAN WG2 Meeting #114-e, e-Meeting—May 19-27, 2021, R2-2106073.
Lenovo, Motorola Mobility, "Coordination between Uu DRX and SL DRX," 3GPP TSG-RAN WG2 Meeting #114 electronic, E-meeting—May 19-27, 2021, R2-2105458.

* cited by examiner

METHOD AND DEVICE FOR SIGNALING OF DRX CONFIGURATION

CROSS-REFERENCE TO RELATED APPLICATION

The present application is a continuation-in-part of currently pending International Patent Application No. PCT/KR2022/011212, filed Jul. 29, 2022, which claims priority to Korean Patent Application Number 10-2021-0102759 filed Aug. 4, 2021, the entire contents of which are incorporated herein for all purposes by these references.

BACKGROUND OF THE PRESENT DISCLOSURE

Field of the Present Disclosure

The present disclosure relates to a sidelink communication technique, and more particularly, to a technique for aligning discontinuous reception (DRX) configurations in sidelink communication.

Description of Related Art

A Fifth-Generation (5G) communication system (e.g., New Radio (NR) communication system) which uses a frequency band higher than a frequency band of a Fourth-Generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g. C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g. C-V2X communications) may be performed based on sidelink communication technologies (e.g. Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g. periodic sidelink data) may be transmitted using the CG resources.

Meanwhile, sidelink (SL) communication may be performed based on a resource allocation (RA) mode 1 or RA mode 2. When the RA mode 1 is used, a transmitting UE may receive configuration information for SL communication from a base station on a Uu link. A discontinuous reception (DRX) operation (hereinafter referred to as 'Uu DRX operation') may be performed on the Uu link between the base station and the transmitting UE, and a DRX operation (hereinafter referred to as 'SL DRX operation') may be performed on an SL between the transmitting UE and the receiving UE. Methods for efficiently performing the Uu DRX operation and SL DRX operation are needed.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and an apparatus for aligning DRX configurations in sidelink.

A method of a first user equipment (UE), according to various exemplary embodiments of the present disclosure for achieving the above-described objective, may include: receiving, from a second UE, a signaling message #1 including second Uu discontinuous reception (DRX) configuration information for a second Uu link between the second UE and a second base station; reconfiguring SL DRX configuration for a sidelink (SL) DRX operation for an SL between the first UE and the second UE in consideration of the second Uu DRX configuration information, so that the SL DRX operation is aligned with the second Uu DRX operation for the second Uu link; and transmitting, to the second UE, a signaling message #2 including the reconfigured SL DRX configuration information.

The SL DRX configuration information may be reconfigured in further consideration of first Uu DRX configuration information for a first Uu link between the first UE and a first base station together with the second Uu DRX configuration information, and the first Uu DRX configuration information may be received from the first base station.

The signaling message #2 may further include first Uu DRX configuration information for a first Uu link between the first UE and a first base station.

The reconfiguring of the SL DRX configuration information may be performed when the SL DRX operation and the second Uu DRX operation conflict.

The SL DRX configuration information may include at least one of a DRX cycle, on-duration, or DRX-related timer.

Each of the signaling message #1 and the signaling message #2 may be transmitted and received based on at least one of higher layer signaling, medium access control (MAC) signaling, or physical (PHY) signaling.

The first UE may be a transmitting UE that transmits SL data to the second UE, the second UE may be a receiving UE that receives the SL data from the first UE, and communication on the SL between the first UE and the second UE may be performed based on resources allocated by a first base station to which the first UE is connected.

A method of a first user equipment (UE), according to various exemplary embodiments of the present disclosure for achieving the above-described objective, may include: transmitting, to a third UE, a signaling message #1-A including first sidelink (SL) discontinuous reception (DRX) configuration information for a first SL between the first UE and a second UE; receiving, from the third UE, a signaling message #2-A including second SL DRX configuration information reconfigured in consideration of the first SL DRX configuration information so that DRX operations are aligned; and transmitting, to the second UE, a signaling message #1-B including the reconfigured second SL DRX configuration information, wherein the reconfigured second SL DRX configuration information is applied to a second SL between the first UE and the third UE.

Among the first SL and the second SL, an SL on which the signaling message #1-A is preferentially transmitted may be determined according to resource allocation (RA) modes applied to the first SL and the second SL.

When an RA mode 1 is applied to the first SL, an RA mode 2 is applied to the second SL, and a priority of the RA mode 2 is higher than a priority of the RA mode 1, or when the RA mode 2 is applied to the second SL, the RA mode 1 is applied to the second SL, and a priority of the RA mode 1 is higher than a priority of the RA mode 2, the signaling message #1-A may be preferentially transmitted to the third UE through the second link.

The method may further include: receiving, from the second UE, a signaling message #2-B including the first SL DRX configuration information reconfigured in consideration of the reconfigured second SL DRX configuration information so that the DRX operations are aligned.

The signaling message #1-A may be used to trigger an alignment procedure of the DRX operations.

The first UE may be a receiving UE that receives SL data from each of the second UE and the third UE, and each of the second UE and the third UE may be a transmitting UE that transmits the SL data to the first UE.

A method of a first user equipment (UE), according to various exemplary embodiments of the present disclosure for achieving the above-described objective, may include: transmitting, to a third UE, a signaling message #1-A including first sidelink (SL) discontinuous reception (DRX) configuration information for a first SL between the first UE and a second UE; receiving, from the third UE, a signaling message #2-A including second SL DRX configuration information reconfigured in consideration of the first SL DRX configuration information so that DRX operations are aligned; reconfiguring the first SL DRX configuration information in consideration of the reconfigured second SL DRX configuration information, so that the DRX operations are aligned; and transmitting, to the second UE, a signaling message #2-B including the reconfigured first SL DRX configuration information, wherein the reconfigured second SL DRX configuration information is applied to a second SL between the first UE and the third UE.

The first UE may operate as a transmitting UE that transmits SL data to the second UE, the first UE may operate as a receiving UE that receives the SL data from the third UE, the second UE may be a receiving UE that receives the SL data from the first UE, and the third UE may be a transmitting UE that transmits the SL data to the first UE.

The second SL DRX configuration information may be reconfigured in further consideration of Uu DRX configuration information for a Uu link between the third UE and a base station together with the first SL DRX configuration information.

Each of the first SL DRX configuration information, the reconfigured first SL DRX configuration information, and the reconfigured second SL DRX configuration information may include at least one of a DRX cycle, on-duration, or DRX-related timer.

The reconfiguring of the first SL DRX configuration information may be performed when a first SL DRX operation on the first link and a second SL DRX operation on the second link conflict.

The signaling message #1-A may be used to trigger an alignment procedure of the DRX operations.

Each of the signaling message #1-A, the signaling message #2-A, and the signaling message #2-B may be transmitted and received based on at least one of higher layer signaling, medium access control (MAC) signaling, or physical (PHY) signaling.

According to an exemplary embodiment of the present disclosure, a UE may reconfigure a DRX operation so that DRX operations are aligned, and transmit DRX reconfiguration information to other UE(s). For example, the UE may reconfigure second SL DRX configuration information for a second SL by considering first SL DRX configuration information for a first SL. In the instant case, conflicts of the DRX operations can be prevented, and the DRX operations in the SLs can be performed efficiently. Therefore, the performance of the communication system can be improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
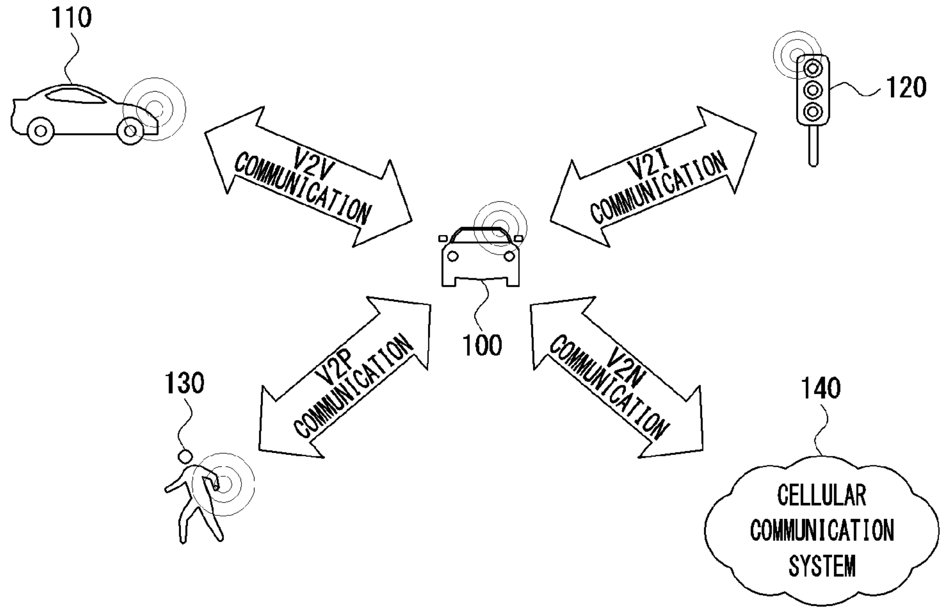
FIG. 1 is a conceptual diagram illustrating V2X communication scenarios.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the contrary, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In exemplary embodiments of the present disclosure, '(re)transmission' may refer to 'transmission', 'retransmission', or 'transmission and retransmission', '(re)configuration' may refer to 'configuration', 'reconfiguration', or 'configuration and reconfiguration', '(re)connection' may refer to 'connection', 'reconnection', or 'connection and reconnection', and '(re)access' may refer to 'access', 're-access', or 'access and re-access'.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g. a cellular communication system 140), and the V2X communications supported by the cellular communication system 140 may be referred to as "Cellular-V2X (C-V2X) communications." Here, the cellular communication system 140 may include the 4G communication system (e.g. LTE communication system or LTE-A communication system), 5G communication system (e.g. NR communication system), and the like.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g. a cellular communication system 140), and the V2X communications supported by the cellular communication system 140 may be referred to as "Cellular-V2X (C-V2X)

communications." Here, the cellular communication system 140 may include the 4G communication system (e.g. LTE communication system or LTE-A communication system), 5G communication system (e.g. NR communication system), 6G communication system, and the like.

The V2V communications may include communications between a first vehicle 100 (e.g. a communication node located in the vehicle 100) and a second vehicle 110 (e.g. a communication node located in the vehicle 110). Various driving information such as velocity, heading, time, position, and the like may be exchanged between the vehicles 100 and 110 through the V2V communications. For example, autonomous driving (e.g. platooning) may be supported based on the driving information exchanged through the V2V communications. The V2V communications supported in the cellular communication system 140 may be performed based on "sidelink" communication technologies (e.g. ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g. the communication node located in the vehicle 100) and an infrastructure (e.g. road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g. ProSe and D2D communication technologies, and the like). In the instant case, the communications between the vehicle 100 and the infrastructure 120 may be performed using at least one sidelink channel established between the vehicle 100 and the infrastructure 120.

The V2P communications may include communications between the first vehicle 100 (e.g. the communication node located in the vehicle 100) and a person 130 (e.g. a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g. ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g. the communication node located in the vehicle 100) and a server connected through the cellular communication system 140. The V2N communications may be performed based on the 4G communication technology (e.g. LTE or LTE-A) or the 5G communication technology (e.g. NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
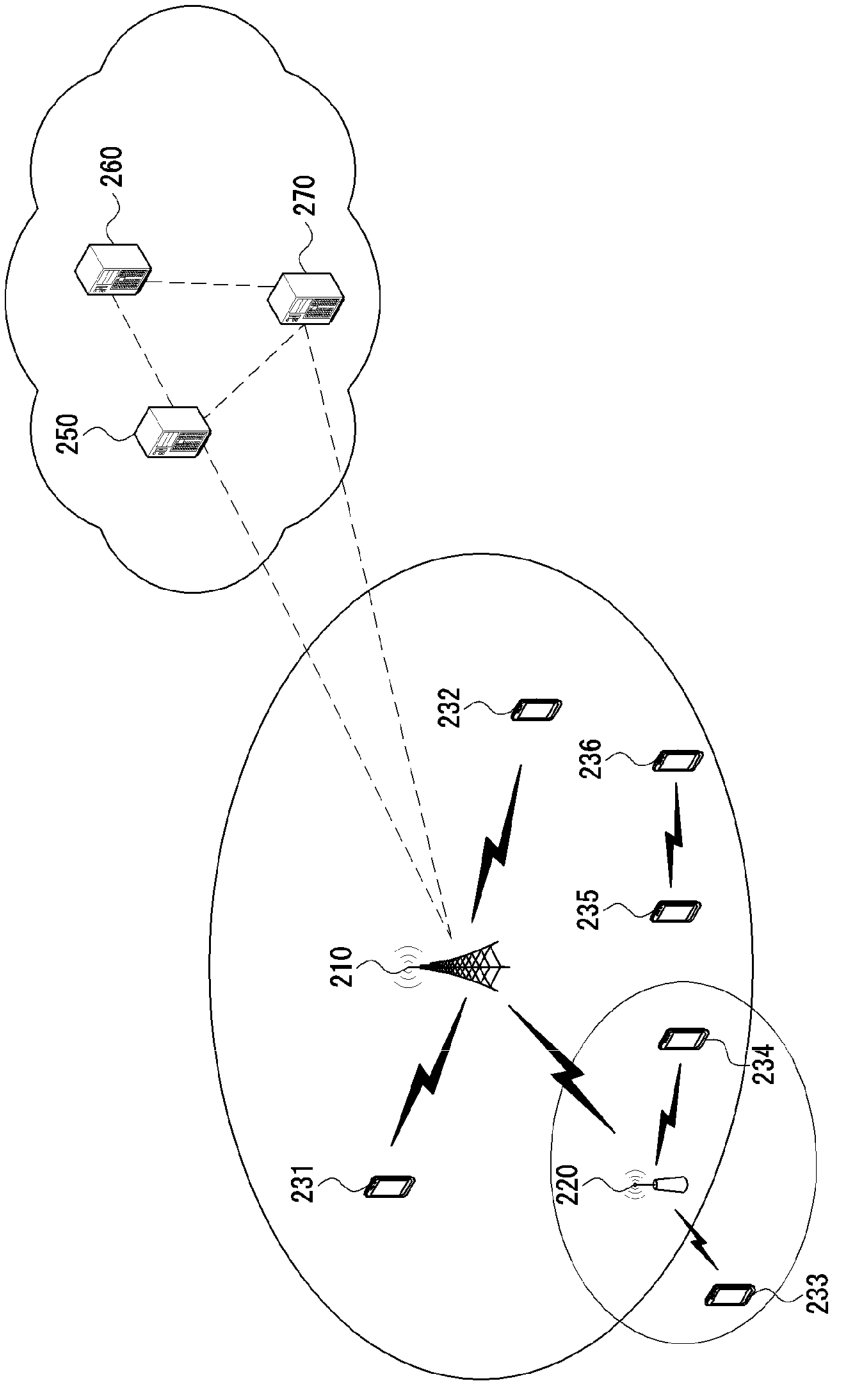
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231, 232, 233, 234, 235 and 236, and the like. The UEs 231, 232, 233, 234, 235 and 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g. a V2V network slice, a V2I network slice, a V2P network slice, a V2N network slice, etc.) may be configured, and the V2X communications may be supported through the V2X network slice configured in the core network.

The communication nodes (e.g. base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g. base station, relay, UE, S-GW, P-GW, MME, UPF, SMF, AMF, etc.) comprising the cellular communication system may be configured as follows.

Figure 3:
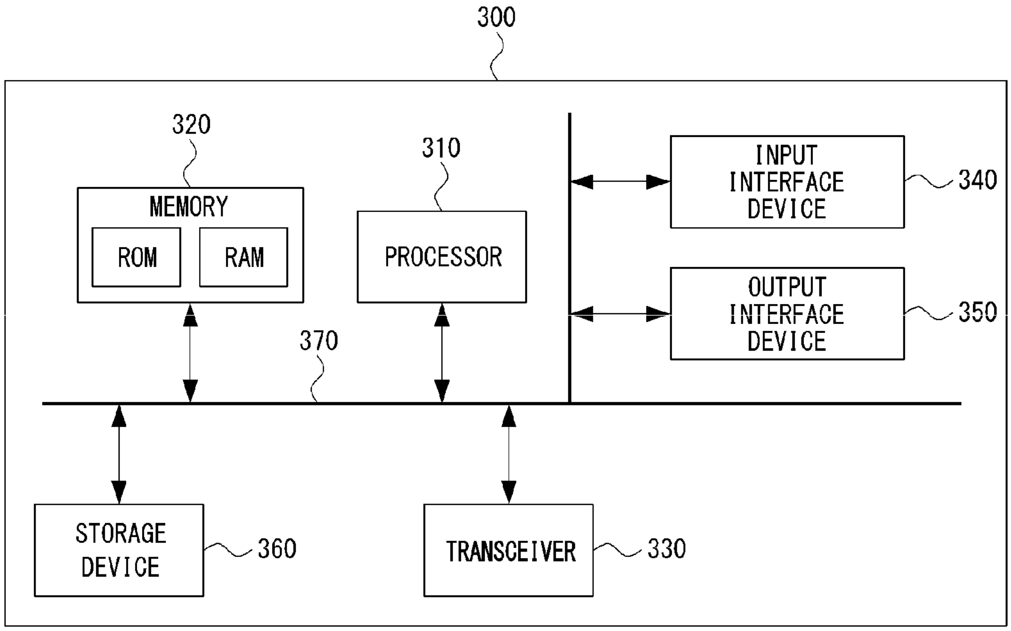
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231, 232, 233, 234, 235 and 236 and the relay 220, and may transmit signals received from the UEs 231, 232, 233, 234, 235 and 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g. single user (SU)-MIMO, multi-user (MU)-MIMO, massive MIMO, etc.), coordinated multipoint (COMP) communication technologies, carrier aggregation (CA) communication technologies, unlicensed band communication technologies (e.g. Licensed Assisted Access (LAA), enhanced LAA (eLAA), etc.), sidelink communication technologies (e.g. ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231, 232, 233, 234, 235 and 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g. the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g. the UEs 235 and 236) performing sidelink communications may be configured as follows.

Figure 4:
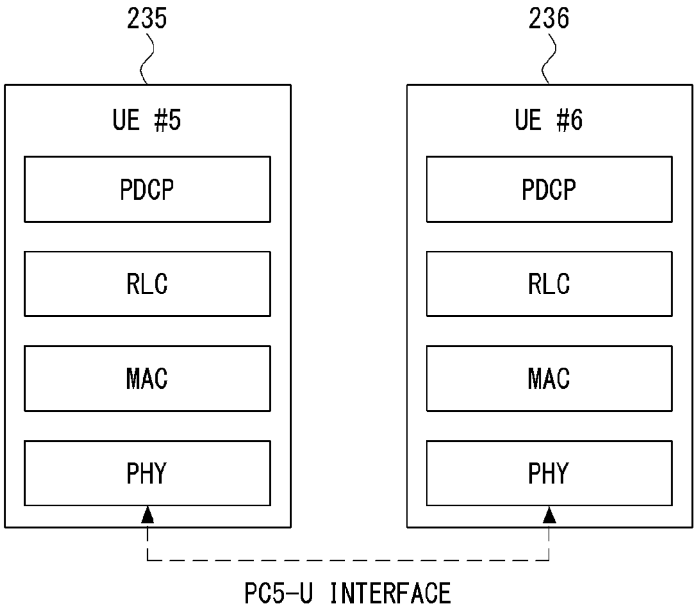
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g. PC5-U interface). A layer-2 identifier (ID) (e.g. a source layer-2 ID, a destination layer-2 ID) may be used for the sidelink communications, and the layer 2-ID may be an ID configured for the V2X communications (e.g. V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g. the UEs 235 and 236) performing sidelink communications may be configured as follows.

Figure 5:
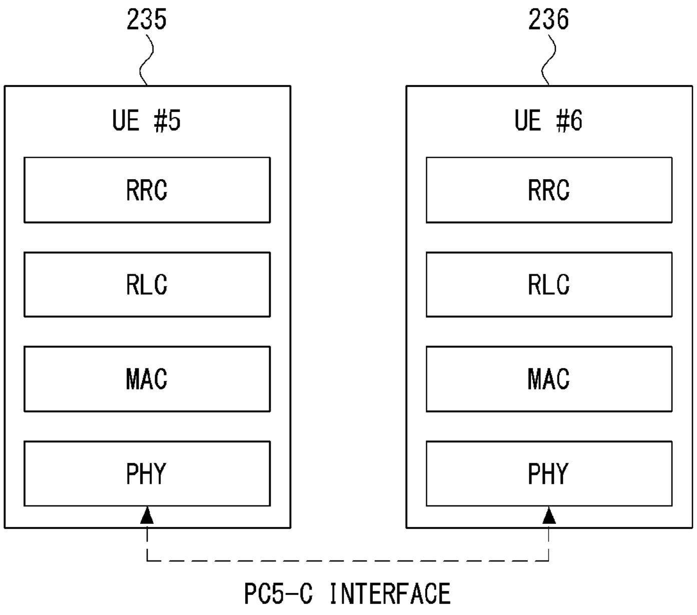
FIG. 5 is a block diagram illustrating a first exemplary embodiment of a control plane protocol stack of a UE performing sidelink communication.
Figure 6:
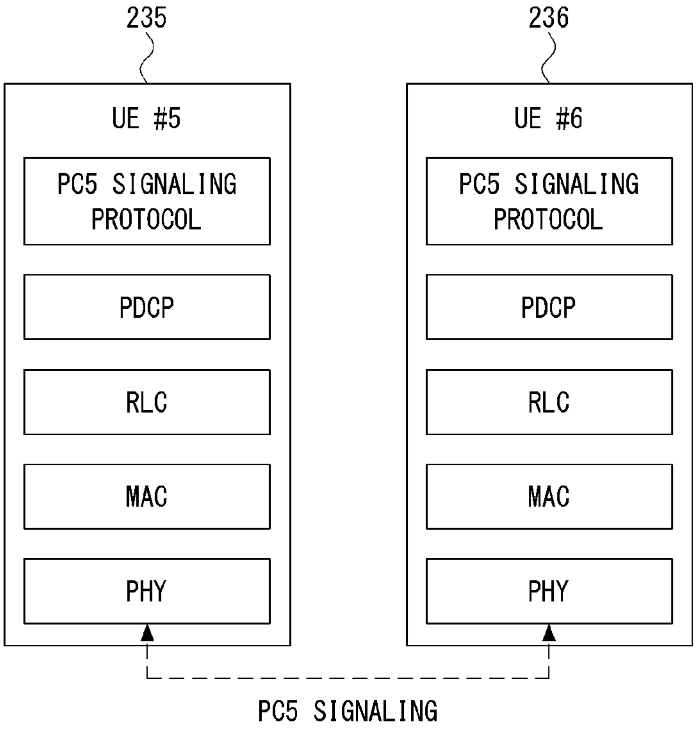
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g. Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g. PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g. UE 235 or 236) by a higher layer signaling. The PSCCH may be used for transmitting and receiving sidelink control information (SCI) and may also be configured in the UE (e.g. UE 235 or 236) by a higher layer signaling.

The PSDCH may be used for a discovery procedure. For example, a discovery signal may be transmitted over the PSDCH. The PSBCH may be used for transmitting and receiving broadcast information (e.g. system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g. a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g. UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g. UE 235 or 236) within the resource pool configured by the dedicated RRC signaling procedure or the broadcast RRC signaling procedure.

Hereinafter, sidelink communication methods will be described. Even when a method (e.g. transmission or reception of a signal) to be performed at a first communication node among communication nodes is described, a corresponding second communication node may perform a method (e.g. reception or transmission of the signal) corresponding to the method performed at the first communication node. That is, when an operation of a UE #1 (e.g. vehicle #1) is described, a UE #2 (e.g. vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g. master information block (MIB), system information block (SIB)) and/or an RRC message. The MAC signaling may refer to an operation of transmitting and receiving a MAC control element (CE). The PHY signaling may refer to an operation of transmitting and receiving control information (e.g. downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g. sidelink data transmission, sidelink-shared channel (SL-SCH) transmission) may be performed based on one SCI (e.g. 1st-stage SCI). When the multi-SCI scheme is used, data transmission may be performed using two SCIs (e.g. 1st-stage SCI and 2nd-stage SCI). The SCI(s) may be transmitted on a PSCCH and/or a PSSCH. When the single-SCI scheme is used, the SCI (e.g. 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A, a SCI format 2-B, and a SCI format 2-C.

The 1st-stage SCI may include or more information elements among priority information, frequency resource assignment information, time resource assignment information, resource reservation period information, demodulation reference signal (DMRS) pattern information, 2nd-stage SCI format information, a beta_offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements. The SCI format 2-C may be used for decoding of a PSSCH and/or providing inter-UE coordination information.

In exemplary embodiments, configuration of an operation (e.g. transmission operation) may mean that configuration information (e.g. information element(s), parameter(s)) for the operation and/or information indicating to perform the operation is signaled. Configuration of information element(s) (e.g. parameter(s)) may mean that the information element(s) are signaled. The signaling may be at least one of system information (SI) signaling (e.g. transmission of a system information block (SIB) and/or master information block (MIB)), RRC signaling (e.g. transmission of RRC parameters and/or higher layer parameters), MAC control element (CE) signaling, or PHY signaling (e.g. transmission of downlink control information (DCI), uplink control information (UCI), and/or sidelink control information (SCI)). Here, the MAC CE signaling operation may be performed through a data channel, the PHY signaling operation may be performed through a control channel or a data channel, and transmission of SCI may mean transmission of first-stage SCI and/or second-stage SCI.

[Signaling Methods for DRX Alignment]

Meanwhile, the communication system may perform discontinuous reception (DRX) operations. A DRX operation (hereinafter referred to as 'Uu DRX operation') may be performed on a Uu link between a base station and a transmitting UE, and a DRX operation (hereinafter referred to as 'SL DRX operation') may be performed on a sidelink (SL) between the transmitting UE and a receiving UE. In exemplary embodiments, a DRX operation may refer to a Uu DRX operation and/or SL DRX operation. To support DRX operations, signaling messages (e.g. signaling-1, signaling-2) may be transmitted, and specification of information element(s) included in the signaling messages may be required. In addition, specification of operation methods based on the signaling messages may be required. Alignment between a Uu DRX operation and an SL DRX operation and/or alignment between SL DRX operations may be required, and specification of an entity that aligns DRX operations (e.g. base station, transmitting UE, receiving UE) may be required. Development of DRX operations depending on a state of the UE (e.g. in-coverage state, out-coverage state, RRC idle state, RRC inactive state, RRC connected state) may be required.

In exemplary embodiment of the present disclosure, DRX alignment (e.g. alignment of DRX operations) may refer to an operation of aligning cycles, durations, and/or offsets for a first DRX operation to cycles, durations, and/or offsets for a second DRX operation. For example, according to a DRX alignment procedure, a start time and/or end time of a cycle for the first DRX operation may be set to be the same as a start and/or end time of a cycle for the second DRX operation. A start time and/or end time of a duration for the first DRX operation may be set to be the same as a start and/or end time of a duration for the second DRX operation. In exemplary embodiments, the DRX alignment procedure may be performed by a communication node (e.g. base station, UE) that configures the corresponding DRX operation. For example, the base station may align DRX operations by reconfiguring a Uu DRX operation, and the base station and/or UE may align DRX operations by reconfiguring an SL DRX operation.

Figure 7:
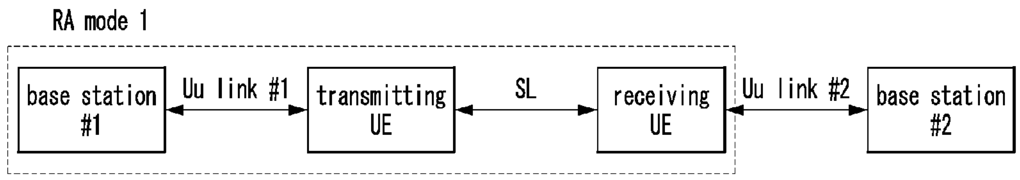
FIG. 7 is a block diagram illustrating a first exemplary embodiment of a communication system supporting SL communication.

FIG. 7 is a block diagram illustrating a first exemplary embodiment of a communication system supporting SL communication.

As shown in FIG. 7, a communication system may include a base station #1, a base station #2, a transmitting UE, and a receiving UE. The base station #1 may support the resource allocation (RA) mode 1. The RA mode 1 may be the sidelink TM 1 or 3 defined in Table 2. The base station #1 and the transmitting UE may be connected through a Uu link #1. A DRX operation performed on the Uu link #1 may be referred to as a Uu DRX operation #1. The transmitting UE and receiving UE may be connected through an SL. Communication on the SL may be performed using resources allocated by the base station #1 to which the transmitting UE is connected. A DRX operation performed on the SL may be referred to as an SL DRX operation. The receiving UE and base station #2 may be connected through a Uu link #2. A DRX operation performed on the Uu link #2 may be referred to as a Uu DRX operation #2. The transmitting UE may operate in the RRC connected state and in-coverage state for the base station #1. The receiving UE may operate in the RRC connected state and in-coverage state for the base station #2. Signaling methods below may be performed for alignment of the Uu DRX operation #1, SL DRX operation, and/or Uu DRX operation #2.

Figure 8:
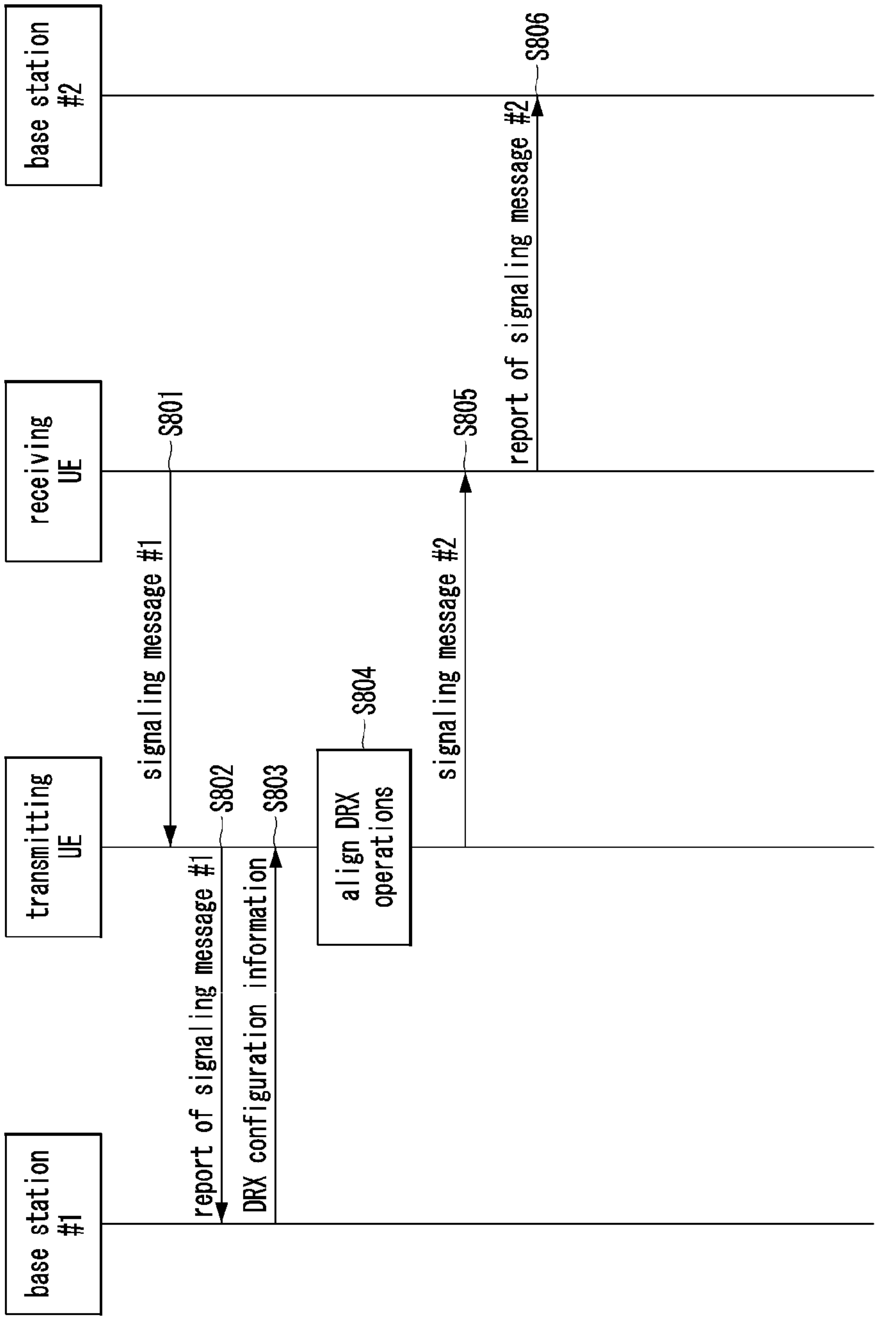
FIG. 8 is a sequence chart illustrating a first exemplary embodiment of a signaling method for aligning DRX operations.

FIG. 8 is a sequence chart illustrating a first exemplary embodiment of a signaling method for aligning DRX operations.

As shown in FIG. 8, a base station #1, base station #2, transmitting UE, and receiving UE may each be the same as the base station #1, base station #2, transmitting UE, and receiving UE shown in FIG. 7. A Uu DRX operation #2 may be configured on the Uu link #2 between the base station #2 and the receiving UE. The receiving UE may generate a signaling message #1 (e.g. signaling-1) including configuration information for the Uu DRX operation #2 (hereinafter referred to as 'Uu DRX configuration information #2'). The receiving UE may transmit the signaling message #1 to the transmitting UE (S801). The signaling message #1 may be used to trigger an alignment procedure of DRX operations. The signaling message #1 may be transmitted through at least one of higher layer signaling, MAC signaling, or PHY signaling. For example, the signaling message #1 may be transmitted through a PC5-RRC message. In exemplary embodiments, DRX configuration information (e.g. Uu DRX configuration information and/or SL DRX configuration information) may include one or more information elements defined in Table 3 below.

TABLE 3

| Information elements |
|---|
| drx-onDurationTimer |
| drx-InactivityTimer |
| drx-HARQ-RTT-TimerDL |
| drx-HARQ-RTT-TimerUL |
| drx-HARQ-RTT-TimerSL |
| drx-RetransmissionTimerUL |
| drx-RetransmissionTimerSL |
| drx-LongCycleStartOffset |
| drx-ShortCycle |
| drx-ShortCycleTimer |

The transmitting UE may receive the signaling message #1 from the receiving UE, and may identify the Uu DRX configuration information #2 (e.g. information element(s) defined in Table 3) included in the signaling message #1. The transmitting UE may report all or part of the information elements included in the signaling message #1 to the base station #1 (S802). In the step S802, the reporting operation may be performed based on at least one of higher layer signaling, MAC signaling, or PHY signaling. The base station #1 may receive the report of the signaling message #1 from the transmitting UE, and may identify the Uu DRX configuration information #2 applied to the Uu link #2 between the base station #2 and the receiving UE based on the received report. The report of the received signaling message #1 in the step S802 may request transmission of DRX configuration information. The base station #1 may transmit DRX configuration information (e.g. Uu DRX configuration information #1) to the transmitting UE (S803). In the step S803, the DRX configuration information may be transmitted based on at least one of higher layer signaling, MAC signaling, or PHY signaling.

The transmitting UE may receive the DRX configuration information (e.g. Uu DRX configuration information #1) from the base station #1. The transmitting UE may (re) configure the SL DRX operation considering the Uu DRX configuration information #1 and/or Uu DRX configuration information #2 (S804). The step S804 may be performed to align the Uu DRX operation #1, SL DRX operation, and Uu DRX operation #2. If alignment of the DRX operations is not required (e.g. no conflict occurs between the DRX operations), the step S804 may not be performed. In the alignment procedure of the DRX operations (e.g. step S804), the DRX cycles, on-durations, off-durations, and/or DRX-related timers may be adjusted to prevent conflicts between the DRX operations.

The transmitting UE may generate SL DRX configuration information based on a result of the step S804. The transmitting UE may generate a signaling message #2 (e.g. signaling-2) including the SL DRX configuration information (e.g. reconfigured SL DRX configuration information), and transmit the signaling message #2 to the receiving UE (S805). The signaling message #2 may be transmitted based on at least one of higher layer signaling, MAC signaling, or PHY signaling.

The receiving UE may receive the signaling message #2 from the transmitting UE. The receiving UE may identify the DRX configuration information (e.g. SL DRX configuration information) included in the signaling message #2. The receiving UE may transmit a report of the signaling message #2 to the base station #2. The reporting operation of the signaling message #2 may be performed based on at least one of higher layer signaling, MAC signaling, or PHY signaling. The base station #2 may receive the report of the signaling message #2 from the receiving UE, and may identify the DRX configuration information (e.g. SL DRS configuration information) based on the received report. According to the above-described operations, the communication nodes (e.g. transmitting UE, receiving UE) may perform DRX operations based on the SL DRX reconfiguration information. The alignment procedure of DRX operations may be performed by another communication node (e.g. base station #1 and/or base station #2) instead of the transmitting UE. For example, the base station #1 may (re)configure the Uu DRX operation #1 by considering the SL DRX configuration information, and the base station #2 may (re)configure the Uu DRX operation #2 by considering the SL DRX configuration information.

Figure 9:
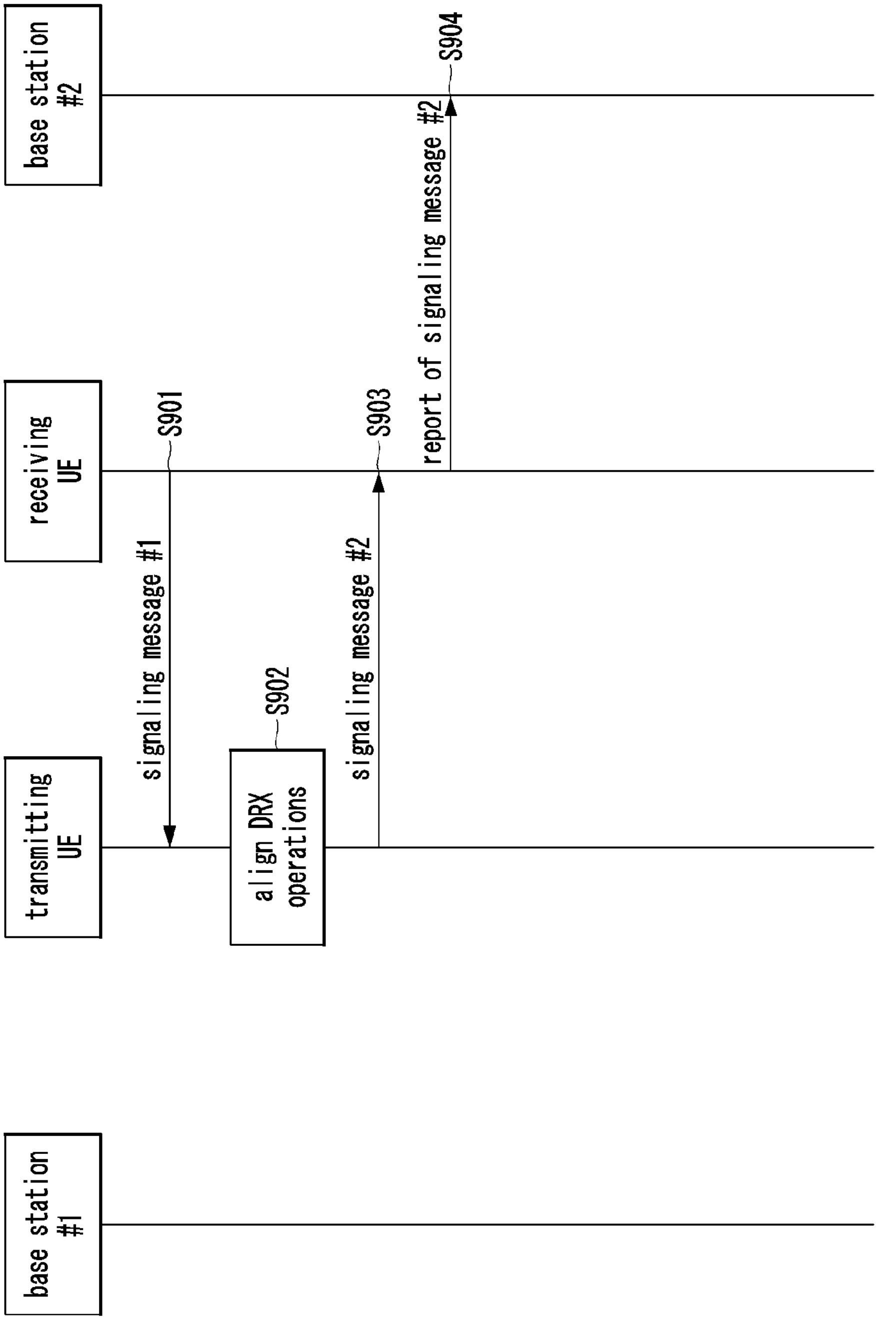
FIG. 9 is a sequence chart illustrating a second exemplary embodiment of a signaling method for aligning DRX operations.

FIG. 9 is a sequence chart illustrating a second exemplary embodiment of a signaling method for aligning DRX operations.

As shown in FIG. 9, a base station #1, base station #2, transmitting UE, and receiving UE may each be the same as the base station #1, base station #2, transmitting UE, and receiving UE shown in FIG. 7. In exemplary embodiments, signaling operations between the communication nodes may be performed based on at least one of higher layer signaling, MAC signaling, or PHY signaling. Unlike the exemplary embodiment of FIG. 8, in the exemplary embodiment of FIG. 9, the operation of the transmitting UE reporting the signaling message #1 to the base station #1 and the operation of the base station #1 transmitting the DRX configuration information to the transmitting UE may not be performed.

The receiving UE may transmit a signaling message #1 (e.g. signaling-1) including the Uu DRX configuration information #2 to the transmitting UE (S901). The signaling message #1 may be used to trigger an alignment procedure of DRX operations. The Uu DRX configuration information #2 may include one or more information elements defined in Table 3 above. The transmitting UE may receive the signaling message #1 from the receiving UE, and may identify the Uu DRX configuration information #2 (e.g. information element(s) defined in Table 3) included in the signaling message #1.

The transmitting UE may perform a (re)configuration operation for the SL DRX operation considering the Uu DRX configuration information #2 (S902). The step S902 may be performed to align the Uu DRX operation #1, SL DRX operation, and/or Uu DRX operation #2. If alignment of DRX operations is not required (e.g. no conflict occurs between the DRX operations), the step S092 may not be performed. In the alignment procedure of DRX operations (e.g. step S902), DRX cycles, on-durations, off-durations, and/or DRX-related timers may be adjusted to prevent conflicts between the DRX operations. In this case, the SL DRX operation between the transmitting UE and the receiving UE may be performed based on reconfiguration information.

The transmitting UE may transmit a signaling message #2 including the SL DRX configuration information (e.g. reconfigured SL DRX configuration information) to the receiving UE based on a result of the step S902 (S903). The signaling message #2 may further include the Uu DRX configuration information #1. The receiving UE may receive the signaling message #2 from the transmitting UE. The receiving UE may report the signaling message #2 to the base station #2 (S904). The base station #2 may receive the report of the signaling message #2 from the receiving UE, and may identify the Uu DRX configuration information #1 and/or SL DRX configuration information based on the received report. According to the above-described operations, the communication nodes (e.g. transmitting UE, receiving UE) may perform DRX operations based on the DRX reconfiguration information. The alignment procedure of the DRX operations may be performed by another communication node (e.g. base station #1 and/or base station #2) instead of the transmitting UE. For example, the base station #2 may (re)configure the Uu DRX operation #2 by considering the SL DRX configuration information.

One of the method shown in FIG. 8 (hereinafter referred to as 'Method 1') and the method shown in FIG. 9 (hereinafter referred to as 'Method 2') may be used. Alternatively, both Method 1 and Method 2 may be used. If (re)configuration of the Uu DRX operation #1 is required for alignment between the Uu DRX operation #1 and the SL DRX operation, the alignment procedure between the Uu DRX operation #1 and the SL DRX operation may be performed based on the DRX configuration information (e.g. Uu DRX configuration information #1 and/or SL DRX configuration information) transmitted by the base station #1 as in Method 1. If (re)configuration of the Uu DRX operation #1 is not required for alignment between the Uu DRX operation #1 and the SL DRX operation, the transmitting UE may perform a configuration operation or reconfiguration operation for the SL DRX operation, and transmit the signaling message #2 including the SL DRX configuration information to the receiving UE as in Method 2.

In Method 1 and Method 2, it may be configured that the receiving UE always reports the signaling message #2 to the base station #2. Alternatively, the reporting operation of the signaling message #2 may be performed selectively. For example, when the SL DRX operation indicated by the signaling message #2 conflicts with the Uu DRX operation #2 and/or when alignment of the DRX operations is required for efficient reception operations, the receiving UE may report the signaling message #2 to the base station #2. In this case, the base station #2 may align the DRX operations by performing a configuration operation or reconfiguration operation for the Uu DRX operation #2 in consideration of the SL DRX configuration information. The base station #2 may transmit reconfiguration information of the Uu DRX operation #2 (e.g. Uu DRX configuration information #2) to the receiving UE. The receiving UE may receive the Uu DRX configuration information #2 from the base station #2, and transmit the signaling message #1 including the Uu DRX configuration information #2 to the transmitting UE. Subsequent operations may be performed based on Method 1 and/or Method 2. Alternatively, when the SL DRX operation indicated by the signaling message #2 does not conflict with the Uu DRX operation #2 and/or when alignment of the DRX operations is not required for efficient reception operations, the receiving UE may not report the signaling message #2 to the base station #2.

Figure 10:
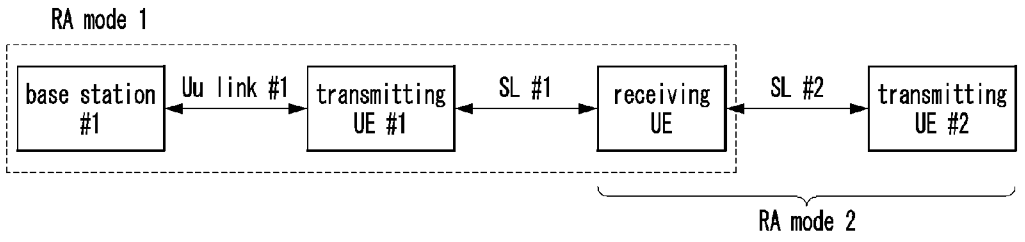
FIG. 10 is a block diagram illustrating a second exemplary embodiment of a communication system supporting SL communication.

FIG. 10 is a block diagram illustrating a second exemplary embodiment of a communication system supporting SL communication.

As shown in FIG. 10, a communication system may include a base station #1, a transmitting UE #1, a transmitting UE #2, and a receiving UE. The base station #1 may support the RA mode 1. The RA mode 1 may be the sidelink TM 1 or 3 defined in Table 2. The base station #1 and transmitting UE #1 may be connected through a Uu link #1. A DRX operation performed on the Uu link #1 may be referred to as a Uu DRX operation #1. The transmitting UE #1 and receiving UE may be connected through an SL #1. Communication on the SL #1 may be performed using resources allocated by the base station #1 to which transmitting UE #1 is connected. A DRX operation performed on the SL #1 may be referred to as an SL DRX operation #1. The receiving UE and transmitting UE #2 may be connected through an SL #2. Communication on the SL #2 may be performed based on the RA mode 2. A DRX operation performed on the SL #2 may be referred to as an SL DRX operation #2.

Method 1 and/or Method 2 may be applied to the communication system shown in FIG. 10. In the instant case, the operations of the base station #2 in Method 1 and/or Method 2 may be performed by the transmitting UE #2. The receiving UE may transmit a signaling message #1 based on SL priorities. The signaling message #1 may be used to trigger an alignment procedure of DRX operations. That is, a DRX (re)configuration operation may be performed based on the SL priorities. For example, an SL priority may be determined based on the RA mode. A priority of an SL to which the RA mode 1 is applied may be higher than a priority of an SL to which the RA mode 2 is applied. Conversely, the priority of the SL to which the RA mode 2 is applied may be higher than the priority of the SL to which the RA mode 1 is applied.

Figure 11:
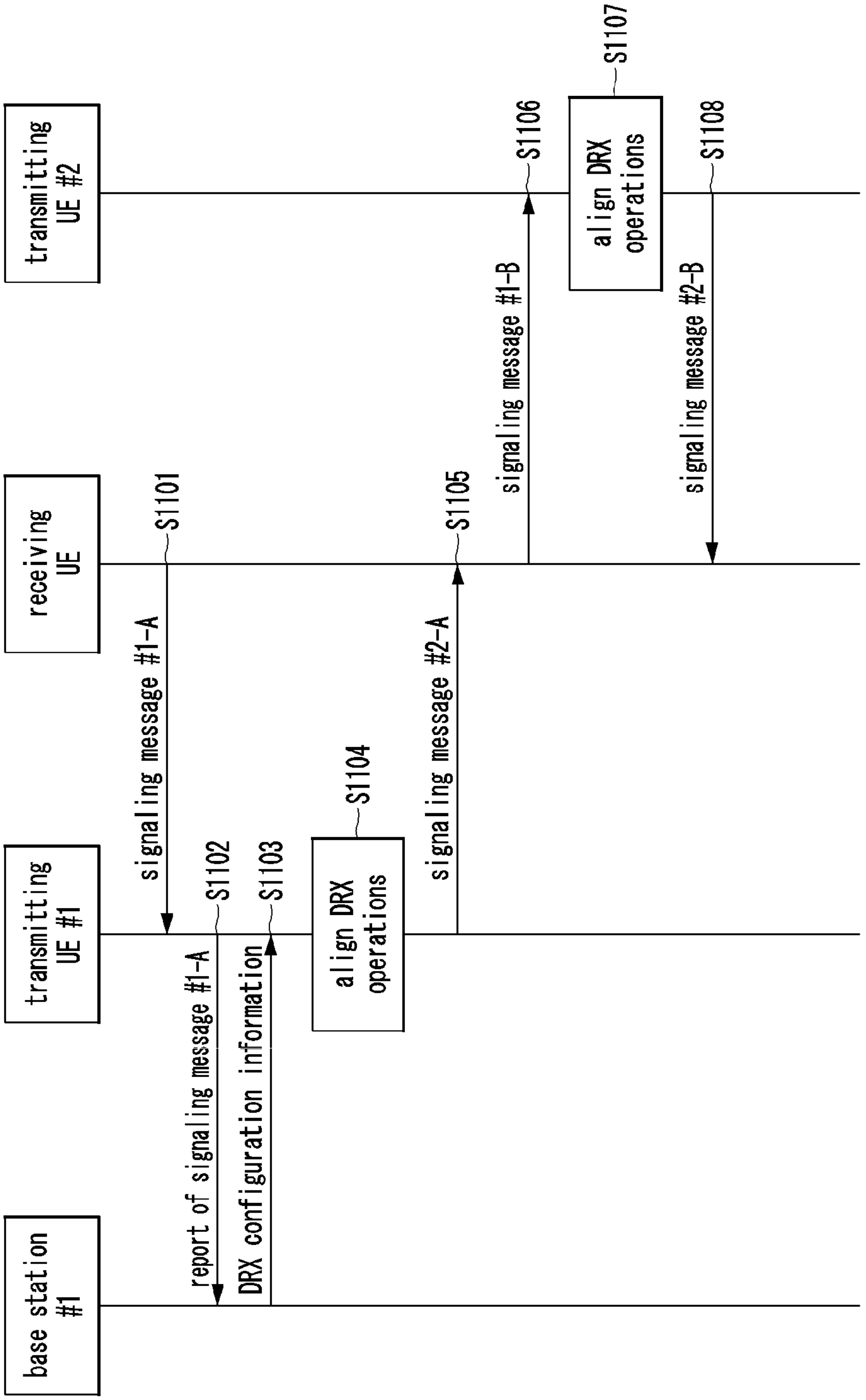
FIG. 11 is a sequence chart illustrating a third exemplary embodiment of a signaling method for aligning DRX operations.

FIG. 11 is a sequence chart illustrating a third exemplary embodiment of a signaling method for aligning DRX operations.

As shown in FIG. 11, a base station #1, transmitting UE #1, transmitting UE #2, and receiving UE each may be the same as the base station #1, transmitting UE #1, transmitting UE #2, and receiving UE shown in FIG. 10. In exemplary embodiments, signaling operations between the communication nodes may be performed based on at least one of higher layer signaling, MAC signaling, or PHY signaling. The RA mode 1 may be applied to an SL #1, and the RA mode 2 may be applied to an SL #2. If an SL priority for the RA mode 1 is higher than an SL priority for the RA mode 2, a DRX reconfiguration operation (e.g. DRX alignment procedure) for the SL #1 to which the RA mode 1 is applied may be performed first.

The receiving UE may transmit a signaling message #1-A to the transmitting UE #1 connected to the base station #1 (S1101). The signaling message #1-A may be used to trigger an alignment procedure of DRX operations. The signaling message #1-A may include SL DRX configuration information #2 for the SL #2 between the receiving UE and transmitting UE #2. The SL DRX configuration information #2 may be applied to the SL #2 between the transmitting UE #2 and receiving UE. The SL DRX configuration information #2 may include information element(s) defined in Table 3 above.

The transmitting UE #1 may receive the signaling message #1-A from the receiving UE and identify the SL DRX configuration information #2 included in the signaling message #1-A. The transmitting UE #1 may report the signaling message #1-A to the base station #1 (S1102). The base station #1 may receive the report of the signaling message #1-A from the transmitting UE #1, and identify the SL DRX configuration information #2 based on the received report. The report of the signaling message #1-A may request transmission of DRX configuration information. The base station #1 may transmit DRX configuration information (e.g. Uu DRX configuration information #1) to the transmitting UE #1 (S1103). In addition, if alignment of DRX operations is required, the base station #1 may (re)configure the Uu DRX configuration information #1 in consideration of the SL DRX configuration information #1 and/or SL DRX configuration information #2.

The transmitting UE #1 may receive the DRX configuration information from the base station #1. If alignment of the DRX operations is required, the transmitting UE #1 may (re)configure the SL DRX operation #1 by considering the Uu DRX configuration information #1 and/or SL DRX configuration information #2 (S1104). That is, transmitting UE #1 may perform the alignment procedure of DRX operations. If alignment of the DRX operations is not required (e.g. no conflict occurs between the DRX operations), the step S1104 may not be performed. In the alignment procedure of DRX operations (e.g. step S1104), DRX cycles, on-duration, off-duration, and/or DRX-related timers for the SL DRX operation #1 may be adjusted to prevent conflicts between the DRX operations. The transmitting UE #1 may transmit a signaling message #2-A including (re) configuration information of the SL DRX operation #1 (e.g. SL DRX configuration information #1) to the receiving UE (S1105). In addition, the signaling message #2-A may further include the Uu DRX configuration information #1. The receiving UE may receive the signaling message #2-A from the transmitting UE #1 and identify the Uu DRX configuration information #1 and/or SL DRX configuration information #1 included in the signaling message #2-A.

The receiving UE may transmit a signaling message #1-B including the Uu DRX configuration information #1 and/or SL DRX configuration information #1 to the transmitting UE #2 (S1106). The signaling message #1-B may be used to trigger an alignment procedure of DRX operations. The transmitting UE #2 may receive the signaling message #1-B from the receiving UE and identify the Uu DRX configuration information #1 and/or SL DRX configuration information #1 included in the signaling message #1-B.

If alignment of DRX operations is required, the transmitting UE #2 may (re)configure the SL DRX operation #2 by considering the Uu DRX configuration information #1 and/or SL DRX configuration information #1 (S1107). That is, the transmitting UE #2 may perform an alignment procedure of DRX operations. If alignment of DRX operations is not required (e.g. no conflict occurs between the DRX operations), the step S1107 may not be performed. In the alignment procedure of DRX operations (e.g. step S1107), DRX cycles, on-duration, off-duration, and/or DRX-related timers for the SL DRX operation #2 may be adjusted to prevent conflicts between the DRX operations. The transmitting UE #2 may transmit a signaling message #2-B including (re) configuration information of the SL DRX operation #2 (e.g. SL DRX configuration information #2) to the receiving UE (S1108). The receiving UE may receive the signaling message #2-B from the transmitting UE #2 and identify the SL DRX configuration information #2 included in the signaling message #2-B. According to the above-described operations, the communication nodes (e.g. transmitting UE #1, transmitting UE #2, receiving UE) may perform the DRX operations based on the reconfiguration information of the DRX operation.

Figure 12:
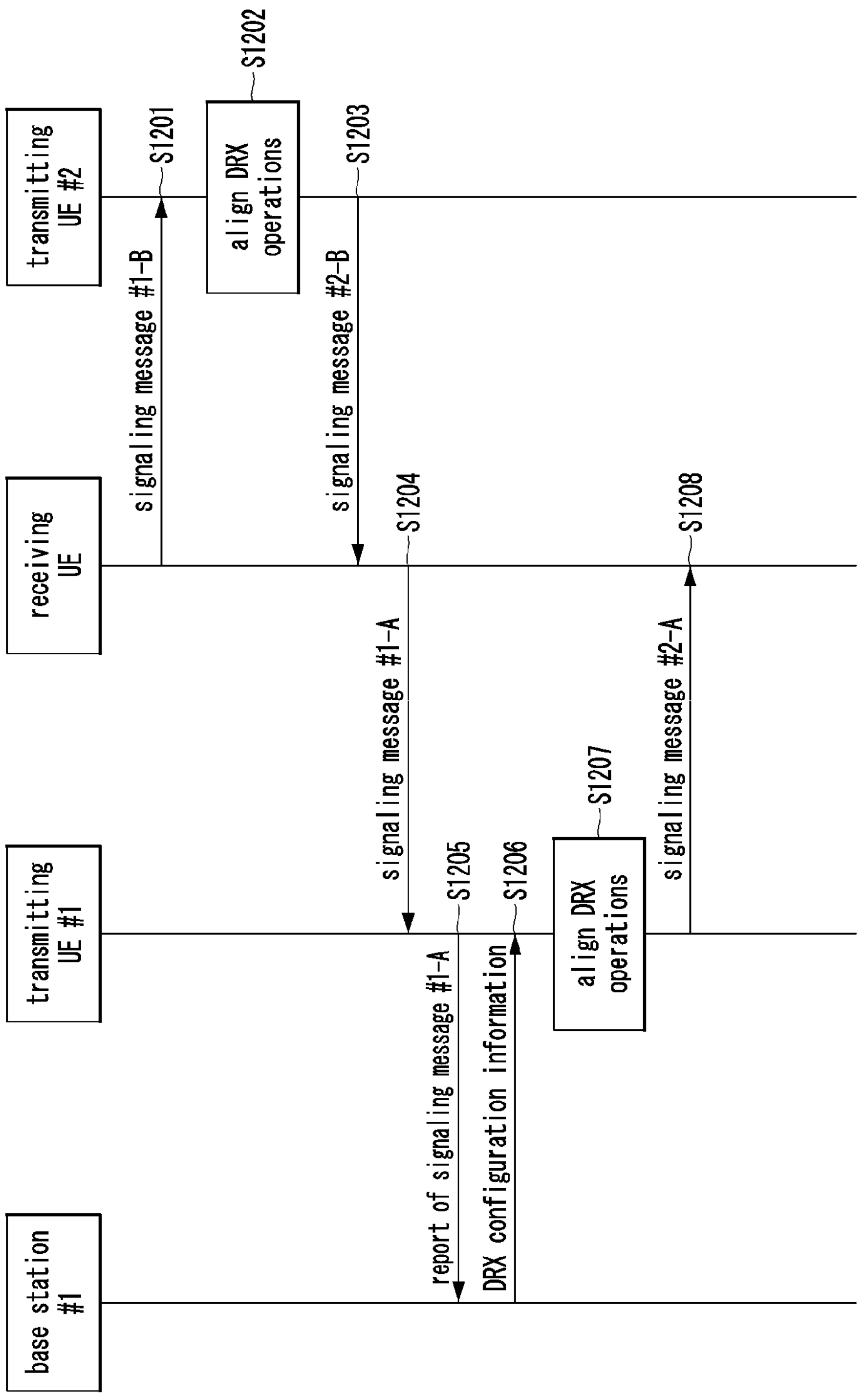
FIG. 12 is a sequence chart illustrating a fourth exemplary embodiment of a signaling method for aligning DRX operations.

FIG. 12 is a sequence chart illustrating a fourth exemplary embodiment of a signaling method for aligning DRX operations.

As shown in FIG. 12, a base station #1, transmitting UE #1, transmitting UE #2, and receiving UE each may be the same as the base station #1, transmitting UE #1, transmitting UE #2, and receiving UE shown in FIG. 10. In exemplary embodiments, signaling operations between the communication nodes may be performed based on at least one of higher layer signaling, MAC signaling, or PHY signaling. The RA mode 1 may be applied to the SL #1, and the RA mode 2 may be applied to the SL #2. If an SL priority for the RA mode 2 is higher than an SL priority for the RA mode 1, a DRX reconfiguration operation for the SL #2 to which the RA mode 2 is applied may be performed first.

The receiving UE may transmit a signaling message #1-B including SL DRX configuration information #1 for the SL #1 to the transmitting UE #2 (S1201). The signaling message #1-B may be used to trigger an alignment procedure of DRX operations. The transmitting UE #2 may receive the signaling message #1-B from the receiving UE and identify the SL DRX configuration information #1 included in the signaling message #1-B. If alignment of DRX operations is required, the transmitting UE #2 may (re)configure the SL DRX operation #2 by considering the SL DRX configuration information #1 (S1202). That is, the transmitting UE #2 may perform the alignment procedure of DRX operations. If alignment of DRX operations is not required (e.g. no conflict occurs between the DRX operations), the step S1202 may not be performed. In the alignment procedure of DRX operations (e.g. step S1202), DRX cycles, on-duration, off-duration, and/or DRX-related timers for the SL DRX operation #2 may be adjusted to prevent conflicts between the DRX operations. The transmitting UE #2 may transmit a signaling message #2-B including (re)configuration information of the SL DRX operation #2 (e.g. SL DRX configuration information #2) to the receiving UE (S1203).

The receiving UE may receive the signaling message #2-B from the transmitting UE #2 and identify the SL DRX configuration information #2 included in the signaling message #2-B. The receiving UE may transmit a signaling message #1-A to the transmitting UE #1 connected to the base station #1 (S1204). The signaling message #1-A may be used to trigger an alignment procedure of DRX operations. The signaling message #1-A may include the SL DRX configuration information #2. The transmitting UE #1 may receive the signaling message #1-A from the receiving UE, and identify the SL DRX configuration information #2 included in the signaling message #1-A. The transmitting UE #1 may report the signaling message #1-A to the base station #1 (S1205). The base station #1 may receive the report of the signaling message #1-A from the transmitting UE #1, and identify the SL DRX configuration information #2 based on the received report. The report of the signaling message #1-A may request transmission of DRX configuration information. The base station #1 may transmit DRX configuration information (e.g. Uu DRX configuration information #1) to the transmitting UE #1 (S1206). In addition, if alignment of DRX operations is required, the base station #1 may (re)configure the Uu DRX configuration information #1 in consideration of the SL DRX configuration information #1 and/or SL DRX configuration information #2.

The transmitting UE #1 may receive the DRX configuration information from the base station #1. If alignment of DRX operations is required, the transmitting UE #1 may (re)configure the SL DRX operation #1 by considering the Uu DRX configuration information #1 and/or SL DRX configuration information #2 (S1207). That is, the transmitting UE #1 may perform an alignment procedure of DRX operations. If alignment of DRX operations is not required (e.g. no conflict occurs between the DRX operations), the step S1207 may not be performed. In the alignment procedure of DRX operations (e.g. step S1207), DRX cycles, on-duration, off-duration, and/or DRX-related timers for the SL DRX operation #1 may be adjusted to prevent conflicts between DRX operations. The transmitting UE #1 may transmit a signaling message #2-A including (re)configuration information of the SL DRX operation #1 (e.g. SL DRX configuration information #1) to the receiving UE (S1208). Additionally, the signaling message #2-A may further include the Uu DRX configuration information #1. The receiving UE may receive the signaling message #2-A from the transmitting UE #1 and identify the Uu DRX configuration information #1 and/or SL DRX configuration information #1 included in the signaling message #2-A. According to the above-described operations, the communication nodes (e.g. transmitting UE #1, transmitting UE #2, receiving UE) may perform DRX operations based on the reconfiguration information of the DRX operation.

In the exemplary embodiments shown in FIGS. 11 and 12, when the transmitting UE #2 operates in the RRC connected state and in-coverage state for the base station #2, the receiving UE may arbitrarily select one of the transmitting UE #1 and transmitting UE #2, and may preferentially perform a (re)configuration operation (e.g. DRX alignment procedure) of the SL DRX operation between the selected transmitting UE and the receiving UE.

Figure 13:
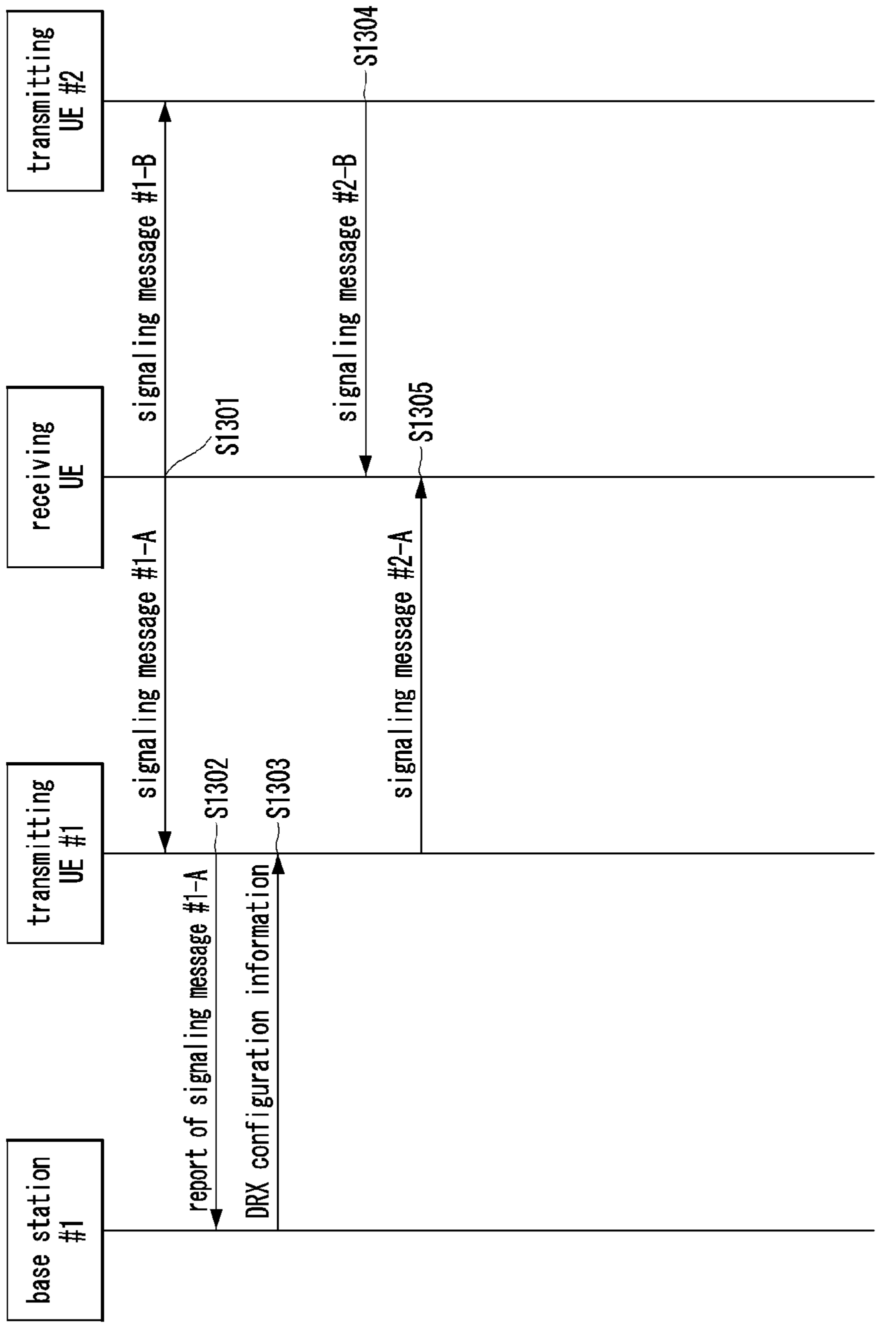
FIG. 13 is a sequence chart illustrating a fifth exemplary embodiment of a signaling method for aligning DRX operations.

FIG. 13 is a sequence chart illustrating a fifth exemplary embodiment of a signaling method for aligning DRX operations.

As shown in FIG. 13, a base station #1, transmitting UE #1, transmitting UE #2, and receiving UE each may be the same as the base station #1, transmitting UE #1, transmitting UE #2, and receiving UE shown in FIG. 10. In exemplary embodiments, signaling operations between the communication nodes may be performed based on at least one of higher layer signaling, MAC signaling, or PHY signaling.

The receiving UE may transmit a signaling message #1 (e.g. signaling message #1-A and signaling message #1-B) without considering SL priorities (S1301). The signaling message #1 may be used to trigger an alignment procedure of DRX operations. For example, the receiving UE may transmit the signaling message #1-A to the transmitting UE #1 in the unicast scheme. The signaling message #1-A may include SL DRX configuration information #2 for the SL #2 between the receiving UE and transmitting UE #2. The receiving UE may transmit the signaling message #1-B to the transmitting UE #2 in the unicast scheme. The signaling message #1-B may include SL DRX configuration information #1 for the SL #1 between the receiving UE and transmitting UE #1. Alternatively, the signaling message #1-A and signaling message #1-B may include the same information (e.g. SL DRX configuration information #1 and SL DRX configuration information #2). If the signaling message #1-A and signaling message #1-B are the same signaling message #1 including the same information, the receiving UE may transmit the signaling message #1 in the groupcast scheme or broadcast scheme.

Operations after the step S1301 (e.g. steps S1302 to S1305) may be performed independently in each communication node. Some operations may be performed simultaneously in different communication nodes. For example, the transmitting UE #1 may receive the signaling message #1-A from the receiving UE and identify the SL DRX configuration information #2 included in the signaling message #1-A. The transmitting UE #1 may report the signaling message #1-A to the base station #1 (S1302). The base station #1 may receive the report of the signaling message #1-A from the transmitting UE #1, and identify the SL DRX configuration information #2 based on the received report. The signaling message #1-A may request transmission of DRX configuration information. The base station #1 may transmit DRX configuration information (e.g. Uu DRX configuration information #1) to the transmitting UE #1 (S1303). In addition, if alignment of DRX operations is required, the base station #1 may (re)configure the Uu DRX configuration information #1 in consideration of the SL DRX configuration information #1 and/or SL DRX configuration information #2.

The transmitting UE #1 may receive the DRX configuration information from the base station #1. If alignment of DRX operations is required, the transmitting UE #1 may (re)configure the SL DRX operation #1 by considering the Uu DRX configuration information #1 and/or SL DRX configuration information #2. That is, the transmitting UE #1 may perform an alignment procedure of DRX operations. If alignment of DRX operations is not required (e.g. no conflicts occur between the DRX operations), the DRX alignment procedure may not be performed. In the DRX alignment procedure, DRX cycles, on-duration, off-duration, and/or DRX-related timers for the SL DRX operation #1 may be adjusted to prevent conflicts between DRX operations. The transmitting UE #1 may transmit a signaling message #2-A including (re)configuration information of the SL DRX operation #1 (e.g. SL DRX configuration information #1) to the receiving UE (S1305). Additionally, the signaling message #2-A may further include the Uu DRX configuration information #1. The receiving UE may receive the signaling message #2-A from the transmitting UE #1 and identify the Uu DRX configuration information #1 and/or SL DRX configuration information #1 included in the signaling message #2-A.

Meanwhile, the transmitting UE #2 may receive the signaling message #1-B from the receiving UE and identify the SL DRX configuration information #1 included in the signaling message #1-B. If alignment of DRX operations is required, the transmitting UE #2 may (re)configure the SL DRX operation #2 by considering the SL DRX configuration information #1. That is, the transmitting UE #2 may perform an alignment procedure of DRX operations. If alignment of DRX operations is not required (e.g. when no conflict occurs between DRX operations), the alignment procedure of DRX operations may not be performed. In the alignment procedure of DRX operations, DRX cycles, on-duration, off-duration, and/or DRX-related timers for the SL DRX operation #2 may be adjusted to prevent conflicts between DRX operations. The transmitting UE #2 may transmit a signaling message #2-B including (re)configuration information of the SL DRX operation #2 (e.g. SL DRX configuration information #2) to the receiving UE (S1304). The receiving UE may receive the signaling message #2-B from the transmitting UE #2 and identify the SL DRX configuration information #2 included in the signaling message #2-B.

According to the above-described operations, the communication nodes (e.g. transmitting UE #1, transmitting UE #2, receiving UE) may perform DRX operations based on the reconfiguration information of the DRX operation. Thereafter, if it is determined that (re)configuration of the SL DRX operation is required on a specific SL, the receiving UE may transmit a signaling message #1 on the specific SL. The alignment procedure of DRX operations may be triggered by transmission of the signaling message #1. In the instant case, the SL DRX operation on the specific SL may be (re)configured.

Meanwhile, the signaling message #1 may be transmitted preferentially for a link for which a DRX operation is not configured instead of a priority. Alternatively, the receiving UE may determine that reconfiguration of a DRX operation is required on a specific link, and may preferentially transmit the signaling message #1 for the specific link. For example, for an alignment procedure of DRX operations on multiple links, a DRX (re)configuration operation may have a priority on another link other than links to which DRX operations are applied, and the receiving UE may preferentially transmit the signaling message #1 on the another link. After transmission of the signaling message #1, a procedure for DRX (re)configuration (e.g. DRX alignment procedure) may be performed. Thereafter, the receiving UE may receive the signaling message #2 including DRX (re)configuration information. In the above-described embodiment, the signaling message #1 may be transmitted in unicast scheme, groupcast scheme, or broadcast scheme.

Figure 14:
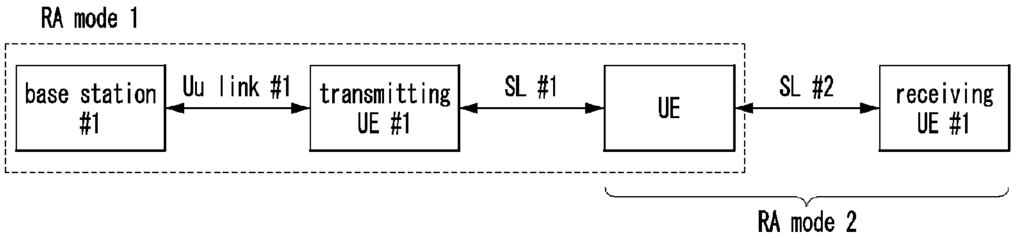
FIG. 14 is a block diagram illustrating a third exemplary embodiment of a communication system supporting SL communication.

FIG. 14 is a block diagram illustrating a third exemplary embodiment of a communication system supporting SL communication.

As shown in FIG. 14, a communication system may include a base station #1, transmitting UE #1, receiving UE #1, and UE. The base station #1 may the support RA mode 1. The RA mode 1 may be the sidelink TM 1 or 3 defined in Table 2. The base station #1 and transmitting UE #1 may be connected through a Uu link #1. A DRX operation performed on the Uu link #1 may be referred to as a Uu DRX operation #1. The transmitting UE #1 and the UE may be connected through an SL #1. Communication on the SL #1 may be performed using resources allocated by the base station #1 to which the transmitting UE #1 is connected. The UE may operate as a receiving UE for the transmitting UE #1. A DRX operation performed on the SL #1 may be referred to as an SL DRX operation #1. The UE and the receiving UE #1 may be connected through an SL #2. Communication on the SL #2 may be performed based on the RA mode 2. A DRX operation performed on the SL #2 may be referred to as an SL DRX operation #2. The UE may operate as a transmitting UE for the receiving UE #1. The exemplary embodiment(s) of FIGS. 15, 16, and/or 17 below may be used for a DRX (re)configuration operation (e.g. DRX alignment procedure) in the scenario illustrated in FIG. 14.

Figure 15:
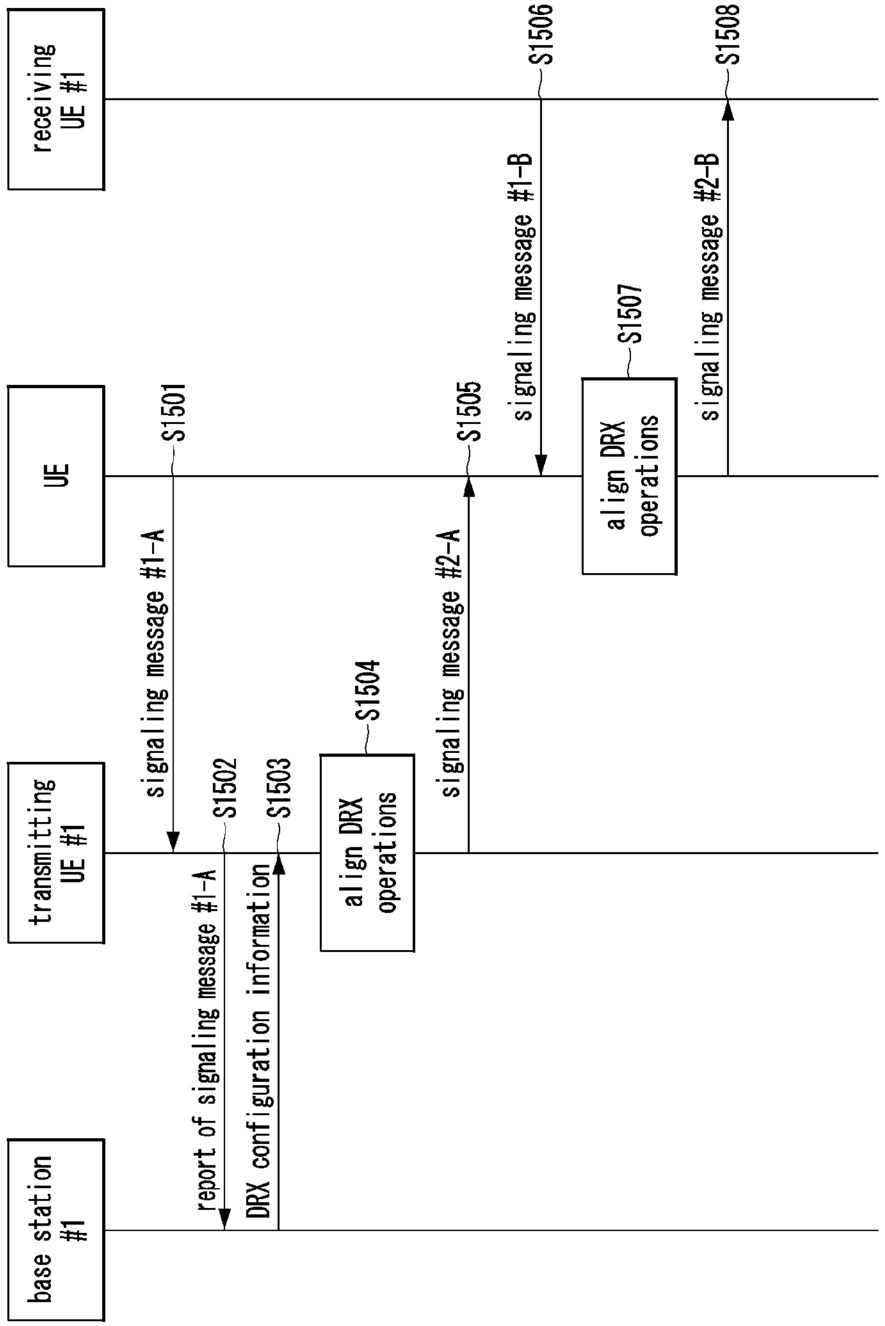
FIG. 15 is a sequence chart illustrating a sixth exemplary embodiment of a signaling method for aligning DRX operations.

FIG. 15 is a sequence chart illustrating a sixth exemplary embodiment of a signaling method for aligning DRX operations.

As shown in FIG. 15, a base station #1, transmitting UE #1, UE, and receiving UE #1 may each be the same as base station #1, transmitting UE #1, UE, and receiving UE #1 shown in FIG. 14. In exemplary embodiments, signaling operations between the communication nodes may be performed based on at least one of higher layer signaling, MAC signaling, or PHY signaling. The RA mode 1 may be applied to the SL #1, and the RA mode 2 may be applied to the SL #2. If an SL priority for the RA mode 1 is higher than an SL priority for the RA mode 2, a DRX reconfiguration operation for the SL #1 to which the RA mode 1 is applied may be performed first.

The UE may transmit a signaling message #1-A to the transmitting UE #1 connected to the base station #1 (S1501). The signaling message #1-A may be used to trigger a DRX alignment procedure (e.g. alignment procedure of DRX operations). The signaling message #1-A may include SL DRX configuration information #2. The SL DRX configuration information #2 may be applied to the SL #2 between the UE and the receiving UE #1. The SL DRX configuration information #2 may include information element(s) defined in Table 3 above. The transmitting UE #1 may receive the signaling message #1-A from the UE (e.g. receiving UE) and identify the SL DRX configuration information #2 included in the signaling message #1-A. The transmitting UE #1 may report the signaling message #1-A to the base station #1 (S1502). The base station #1 may receive the report of the signaling message #1-A from the transmitting UE #1, and identify the SL DRX configuration information #2 based on the received report. The report of the signaling message #1-A may request transmission of DRX configuration information. The base station #1 may transmit DRX configuration information (e.g. Uu DRX configuration information #1) to the transmitting UE #1 (S1503). Additionally, if alignment of DRX operations is required, the base station #1 may (re)configure the Uu DRX configuration information #1 in consideration of the SL DRX configuration information #1 and/or SL DRX configuration information #2.

The transmitting UE #1 may receive the DRX configuration information from the base station #1. If alignment of DRX operations is required, the transmitting UE #1 may (re)configure the SL DRX operation #1 by considering the Uu DRX configuration information #1 and/or SL DRX configuration information #2 (S1504). That is, the transmitting UE #1 may perform an alignment procedure of DRX operations. If alignment of DRX operations is not required (e.g. no conflict occurs between the DRX operations), the step S1504 may not be performed. In the DRX alignment procedure (e.g. step S1504), DRX cycles, on-duration, off-duration, and/or DRX-related timer for the SL DRX operation #1 may be adjusted to prevent conflicts between DRX operations. The transmitting UE #1 may transmit a signaling message #2-A including (re)configuration information of the SL DRX operation #1 (e.g. SL DRX configuration information #1) to the UE (S1505). Additionally, the signaling message #2-A may further include Uu DRX configuration information #1. The UE may receive the signaling message #2-A from the transmitting UE #1 and identify the Uu DRX configuration information #1 and/or SL DRX configuration information #1 included in the signaling message #2-A.

The receiving UE #1 may transmit a signaling message #1-B including the SL DRX configuration information #2 to the UE (e.g. transmitting UE) (S1506). The signaling message #1-B may be used to trigger a DRX alignment procedure. The UE may receive the signaling message #1-B from the receiving UE #1 and identify the SL DRX configuration information #2 included in the signaling message #1-B.

If alignment of DRX operations is required, the UE may (re)configure the SL DRX operation #2 by considering the Uu DRX configuration information #1 and/or SL DRX configuration information #1 (S1507). That is, the UE may perform a DRX alignment procedure. If alignment of DRX operations is not required (e.g. no conflict occurs between DRX operations), the step S1507 may not be performed. In the DRX alignment procedure (e.g. step S1507), DRX cycles, on-duration, off-duration, and/or DRX-related timers for the SL DRX operation #2 may be adjusted to prevent conflicts between DRX operations. The UE may transmit a signaling message #2-B including (re)configuration information of SL DRX operation #2 (e.g. SL DRX configuration information #2) to the receiving UE #1 (S1508). The receiving UE #1 may receive the signaling message #2-B from the UE and identify the SL DRX configuration information #2 included in the signaling message #2-B. According to the above-described operations, the communication nodes (e.g. transmitting UE #1, UE, and receiving UE #1) may perform DRX operations based on the reconfiguration information of the DRX operation.

Figure 16:
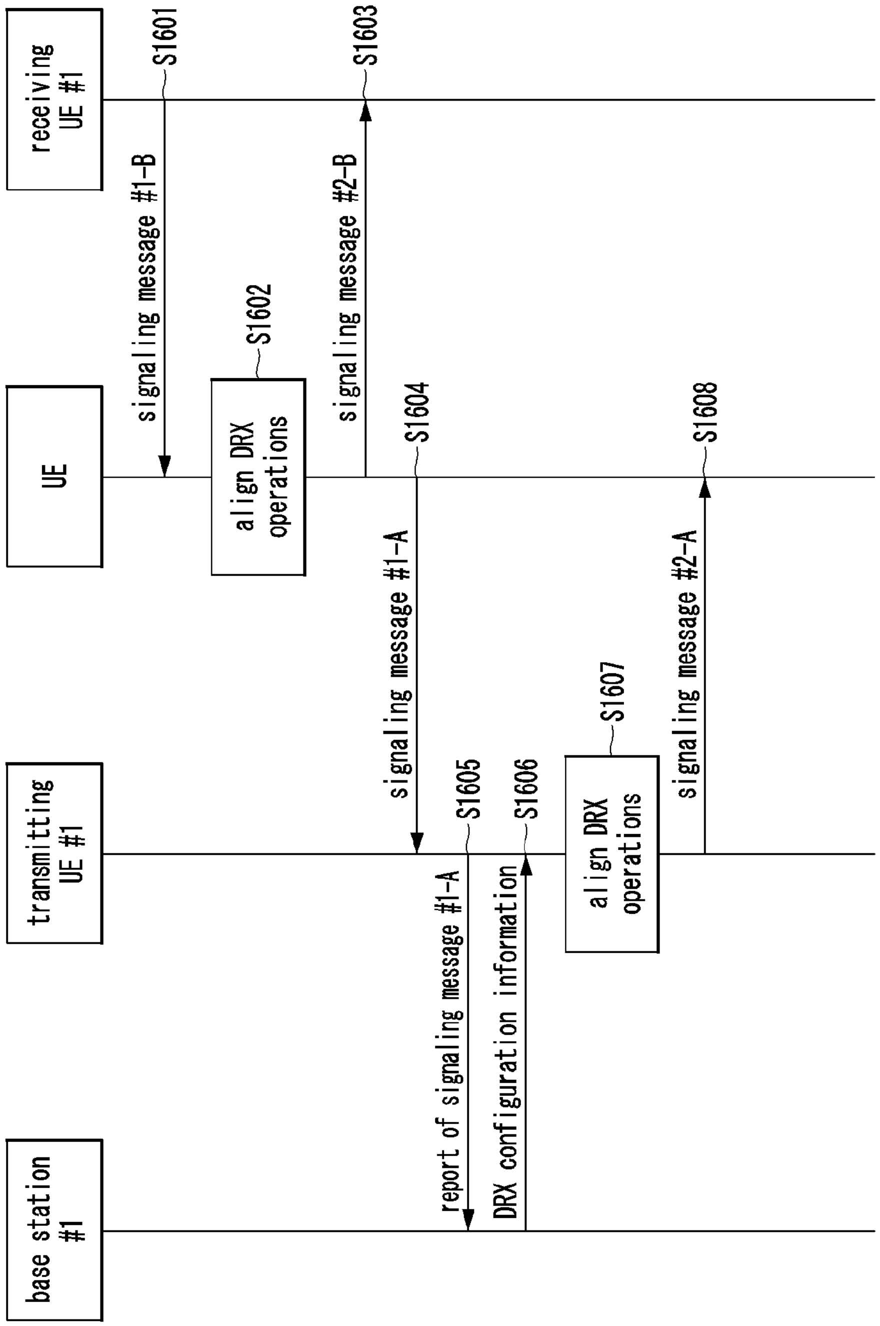
FIG. 16 is a sequence chart illustrating a seventh exemplary embodiment of a signaling method for aligning DRX operations.

FIG. 16 is a sequence chart illustrating a seventh exemplary embodiment of a signaling method for aligning DRX operations.

As shown in FIG. 16, a base station #1, transmitting UE #1, UE, and receiving UE #1 may each be the same as base station #1, transmitting UE #1, UE, and receiving UE #1 shown in FIG. 14. In exemplary embodiments, signaling operations between the communication nodes may be performed based on at least one of higher layer signaling, MAC signaling, or PHY signaling. The RA mode 1 may be applied to the SL #1, and the RA mode 2 may be applied to the SL #2. If an SL priority for the RA mode 2 is higher than an SL priority for the RA mode 1, a DRX reconfiguration operation for the SL #2 to which the RA mode 2 is applied may be performed first.

The receiving UE #1 may transmit a signaling message #1-B including SL DRX configuration information #2 for the SL #2 to the UE (e.g. transmitting UE) (S1601). The signaling message #1-B may be used to trigger a DRX alignment procedure (e.g. alignment procedure of DRX operations). The UE may receive the signaling message #1-B from the receiving UE #1 and identify the SL DRX configuration information #2 included in the signaling message #1-B. If alignment of DRX operations is required, the UE may (re)configure the SL DRX operation #2 (S1602). The step S1602 may be performed considering other DRX configuration information (e.g. SL DRX configuration information #1). That is, the UE may perform an alignment procedure of DRX operations. If alignment of DRX operations is not required (e.g. no conflict occurs between DRX operations), the step S1602 may not be performed. In the alignment procedure of DRX operations (e.g. step S1602), DRX cycles, on-duration, off-duration, and/or DRX-related timer for the SL DRX operation #2 may be adjusted to prevent conflicts between DRX operations. The UE may transmit a signaling message #2-B including (re)configuration information of the SL DRX operation #2 (e.g. SL DRX configuration information #2) to the receiving UE #1 (S1603). The receiving UE #1 may receive the signaling message #2-B from the UE and identify the SL DRX configuration information #2 included in the signaling message #2-B.

The UE may transmit a signaling message #1-A to the transmitting UE #1 connected to the base station #1 (S1604). The signaling message #1-A may be used to trigger a DRX alignment procedure. The signaling message #1-A may include the SL DRX configuration information #2. For example, the signaling message #1-A may include all or part of the SL DRX configuration information #2 included in the signaling message #1-B in the step S1601 or all or part of the SL DRX configuration information #2 included in the signaling message #2-B in the step S1603. The transmitting UE #1 may receive the signaling message #1-A from the UE and identify the SL DRX configuration information #2 included in the signaling message #1-A. The transmitting UE #1 may report the signaling message #1-A to the base station #1 (S1605). The base station #1 may receive the report of the signaling message #1-A from the transmitting UE #1, and may identify the SL DRX configuration information #2 based on the received report. The report of the signaling message #1-A may request transmission of DRX configuration information. The base station #1 may transmit DRX configuration information (e.g. Uu DRX configuration information #1) to the transmitting UE #1 (S1606). Additionally, if alignment of DRX operations is required, the base station #1 may (re)configure the Uu DRX configuration information #1 in consideration of the SL DRX configuration information #1 and/or SL DRX configuration information #2.

The transmitting UE #1 may receive the DRX configuration information from the base station #1. If alignment of DRX operations is required, the transmitting UE #1 may (re)configure the SL DRX operation #1 by considering the Uu DRX configuration information #1 and/or SL DRX configuration information #2 (S1607). That is, transmitting UE #1 may perform an alignment procedure of DRX operations. If alignment of DRX operations is not required (e.g. no conflict occurs between DRX operations), the step S1607 may not be performed. In the alignment procedure of DRX operations (e.g. step S1607), DRX cycles, on-duration, off-duration, and/or DRX-related timers for the SL DRX operation #1 may be adjusted to prevent conflicts between DRX operations. The transmitting UE #1 may transmit a signaling message #2-A including (re)configuration information of the SL DRX operation #1 (e.g. SL DRX configuration information #1) to the UE (S1608). Additionally, the signaling message #2-A may further include Uu DRX configuration information #1. The UE may receive the signaling message #2-A from the transmitting UE #1 and identify the Uu DRX configuration information #1 and/or SL DRX configuration information #1 included in the signaling message #2-A. According to the above-described operations, the communication nodes (e.g. transmitting UE #1, UE, receiving UE #1) may perform DRX operations based on the reconfiguration information of the DRX operation.

In the exemplary embodiments of FIGS. 15 and/or 16, when DRX configuration information exists, when configuration of DRX operations is required, or when reconfiguration of DRX operations is required, the UE may transmit the signaling message #1-A to the transmitting UE #1, and the receiving UE #1 may transmit the signaling message #1-B to the UE. According to the above-described operations, a DRX (re)configuration operation may be triggered.

Figure 17:
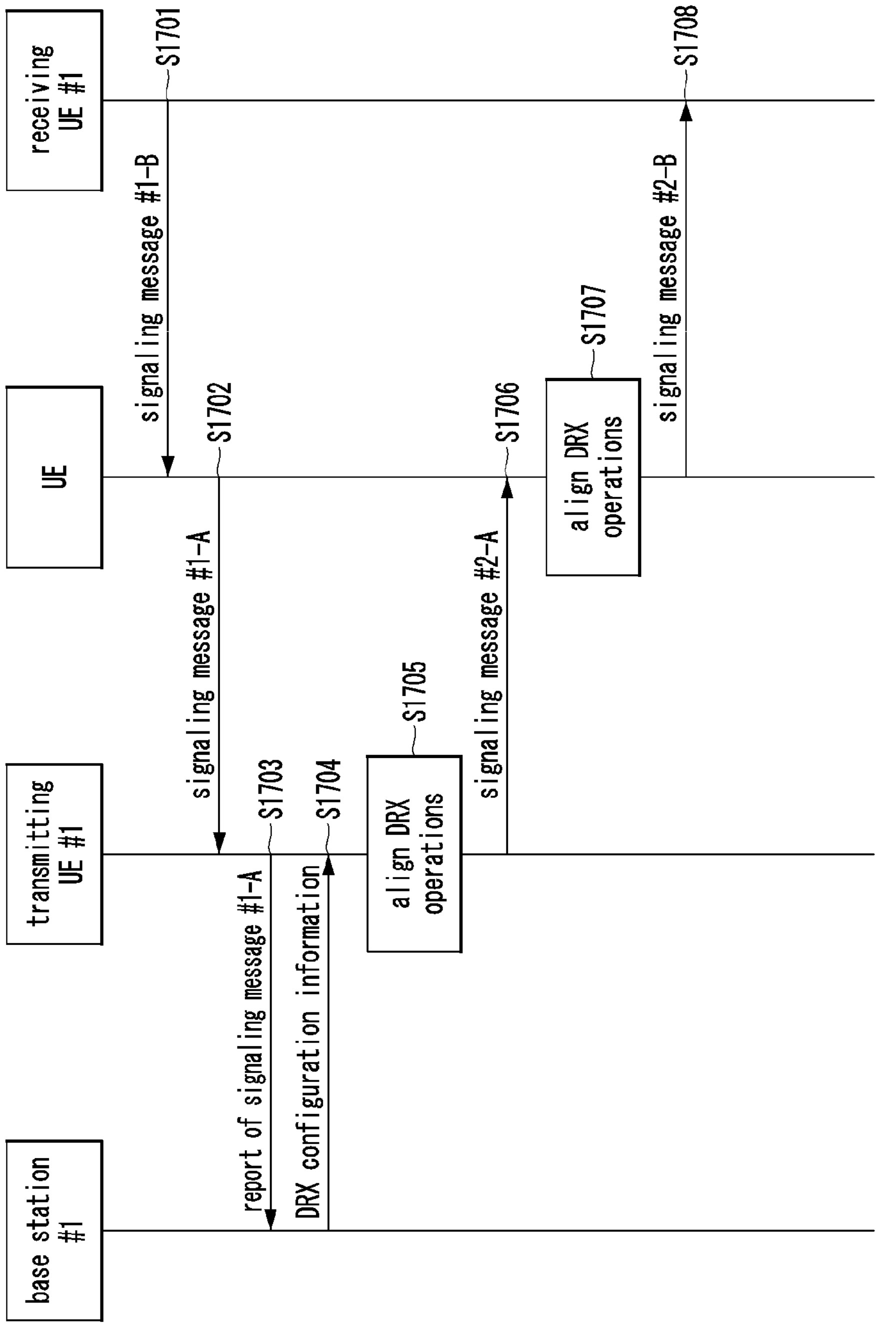
FIG. 17 is a sequence chart illustrating an eighth exemplary embodiment of a signaling method for aligning DRX operations.

FIG. 17 is a sequence chart illustrating an eighth exemplary embodiment of a signaling method for aligning DRX operations.

As shown in FIG. 17, a base station #1, transmitting UE #1, UE, and receiving UE #1 may each be the same as base station #1, transmitting UE #1, UE, and receiving UE #1 shown in FIG. 14. In exemplary embodiments, signaling operations between the communication nodes may be performed based on at least one of higher layer signaling, MAC signaling, or PHY signaling. The RA mode 1 may be applied to the SL #1, and the RA mode 2 may be applied to the SL #2. If an SL priority for the RA mode 2 is higher than an SL priority for the RA mode 1, a DRX reconfiguration operation for the SL #2 to which the RA mode 2 is applied may be performed first.

The receiving UE #1 may transmit a signaling message #1-B including SL DRX configuration information #2 for the SL #2 to the UE (e.g. transmitting UE) (S1701). The signaling message #1-B may be used to trigger a DRX alignment procedure. The UE may receive the signaling message #1-B from the receiving UE #1 and identify the SL DRX configuration information #2 included in the signaling message #1-B. The UE may transmit a signaling message #1-A to the transmitting UE #1 connected to the base station #1 (S1702). The signaling message #1-A may be used to trigger a DRX alignment procedure. The signaling message #1-A may include all or part of the SL DRX configuration information #2. The transmitting UE #1 may receive the signaling message #1-A from the UE and identify the SL DRX configuration information #2 included in the signaling message #1-A. The transmitting UE #1 may report the signaling message #1-A to the base station #1 (S1703). The base station #1 may receive the report of the signaling message #1-A from the transmitting UE #1, and may identify the SL DRX configuration information #2 based on the received report. The base station #1 may transmit DRX configuration information (e.g. Uu DRX configuration information #1) to the transmitting UE #1 (S1704). Additionally, if alignment of DRX operations is required, the base station #1 may (re)configure the Uu DRX configuration information #1 in consideration of the SL DRX configuration information #1 and/or SL DRX configuration information #2.

The transmitting UE #1 may receive the DRX configuration information from the base station #1. If alignment of DRX operations is required, the transmitting UE #1 may (re)configure the SL DRX operation #1 by considering the Uu DRX configuration information #1 and/or SL DRX configuration information #2 (S1705). That is, the transmitting UE #1 may perform an alignment procedure of DRX operations. If alignment of DRX operations is not required (e.g. no conflict occurs between DRX operations), the step S1705 may not be performed. In the alignment procedure of DRX operations (e.g. step S1705), DRX cycles, on-duration, off-duration, and/or DRX-related timers for the SL DRX operation #1 may be adjusted to prevent conflicts between DRX operations. The transmitting UE #1 may transmit a signaling message #2-A including (re)configuration information of the SL DRX operation #1 (e.g. SL DRX configuration information #1) to the UE (S1706). Additionally, the signaling message #2-A may further include the Uu DRX configuration information #1. The UE may receive the signaling message #2-A from the transmitting UE #1 and identify the Uu DRX configuration information #1 and/or SL DRX configuration information #1 included in the signaling message #2-A.

If alignment of DRX operations is required, the UE may (re)configure the SL DRX operation #2 by considering the Uu DRX configuration information #1 and/or SL DRX configuration information #1 (S1707). That is, the UE may perform an alignment procedure of DRX operations. If alignment of DRX operations is not required (e.g. no conflict occurs between DRX operations), the step S1707 may not be performed. In the alignment procedure of DRX operations (e.g. step S1707), DRX cycles, on-duration, off-duration, and/or DRX-related timer for the SL DRX operation #2 may be adjusted to prevent conflicts between DRX operations. The UE may transmit a signaling message #2-B including (re)configuration information of the SL DRX operation #2 (e.g. SL DRX configuration information #2) to the receiving UE #1 (S1708). The receiving UE #1 may receive the signaling message #2-B from the UE and identify the SL DRX configuration information #2 included in the signaling message #2-B. According to the above-described operations, the communication nodes (e.g. transmitting UE #1, UE, and receiving UE #1) may perform DRX operations based on the reconfiguration information of the DRX operation.

The above-described exemplary embodiment(s) may be applied to a scenario in which a plurality of links are established. A receiving UE that receives data on multiple links may have multiple DRX configurations for multiple links. In the instant case, the receiving UE may transmit a signaling message #1 including a plurality of DRX configuration information to transmitting UE(s). According to the above-described operation, a DRX (re)configuration operation (e.g. alignment procedure of DRX operations) may be triggered.

Alternatively, DRX configuration information for a link on which the receiving UE operates among a plurality of links may be transmitted to a transmitting UE through the signaling message #1. According to the above-described operations, a DRX (re)configuration operation (e.g. alignment procedure of DRX operations) may be triggered. The link on which the receiving UE operates may be a link with an RRC connected state, a link with an active state, and/or a link capable of transmitting and receiving signals.

As another method, the receiving UE may select one or more pieces of DRX configuration information with a higher priority from among a plurality of pieces of DRX configuration information, and transmit a signaling message #1 including the one or more pieces of selected DRX configuration information to the transmitting UE. The priority of DRX configuration information may be determined based on the length indicated by DRX parameter(s) (e.g. DRX cycle, on-duration, off-duration, timer, etc.).

[Method for Entering DRX Operation and Operation Method According to Timer]

Figure 18:
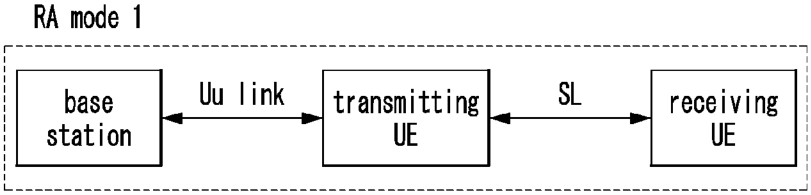
FIG. 18 is a block diagram illustrating a fourth exemplary embodiment of a communication system supporting SL communication.

FIG. 18 is a block diagram illustrating a fourth exemplary embodiment of a communication system supporting SL communication.

As shown in FIG. 18, a communication system may include a base station, a transmitting UE, and a receiving UE. The base station may support the RA mode 1. The base station and the transmitting UE may be connected through a Uu link. The transmitting UE and receiving UE may be connected through an SL. A Uu DRX operation may be performed on the Uu link, and an SL DRX operation may be performed on the SL. The transmitting UE may operate as a receiving UE for the base station, and a time when the transmitting UE starts the Uu DRX operation may be a time when a DRX-related timer set on the Uu link expires. The DRX-related timer may be an inactivity timer for the Uu link. The inactivity timer may be drx-Inactivitytimer defined in Table 3. When the transmitting UE receives a PDCCH for SL transmission from the base station, the inactivity timer may be started or restarted. The PDCCH may be a PDCCH (e.g. DCI format 3_x) indicating new SL transmission.

When SL communication is being performed between the transmitting UE and the receiving UE, the transmitting UE may need to receive resource allocation information for the SL communication from the base station. Therefore, the transmitting UE may not be able to start the Uu DRX operation. That is, entry into the Uu DRX operation may be impossible. Alternatively, when the SL DRX operation is being performed, the transmitting UE may start the Uu DRX operation.

To support an alignment procedure between the Uu DRX operation and the SL DRX operation, a timer for the SL DRX operation, which is set in the receiving UE, may be synchronized with a timer for the Uu DRX operation, which is set in the transmitting UE. A timer for entry into (e.g. start of) the SL DRX operation between the transmitting UE and the receiving UE may be referred to as an SL inactivity timer. A timer for entry into (e.g. start of) the Uu DRX operation between the base station and the transmitting UE may be referred to as a Uu inactivity timer.

Figure 19:
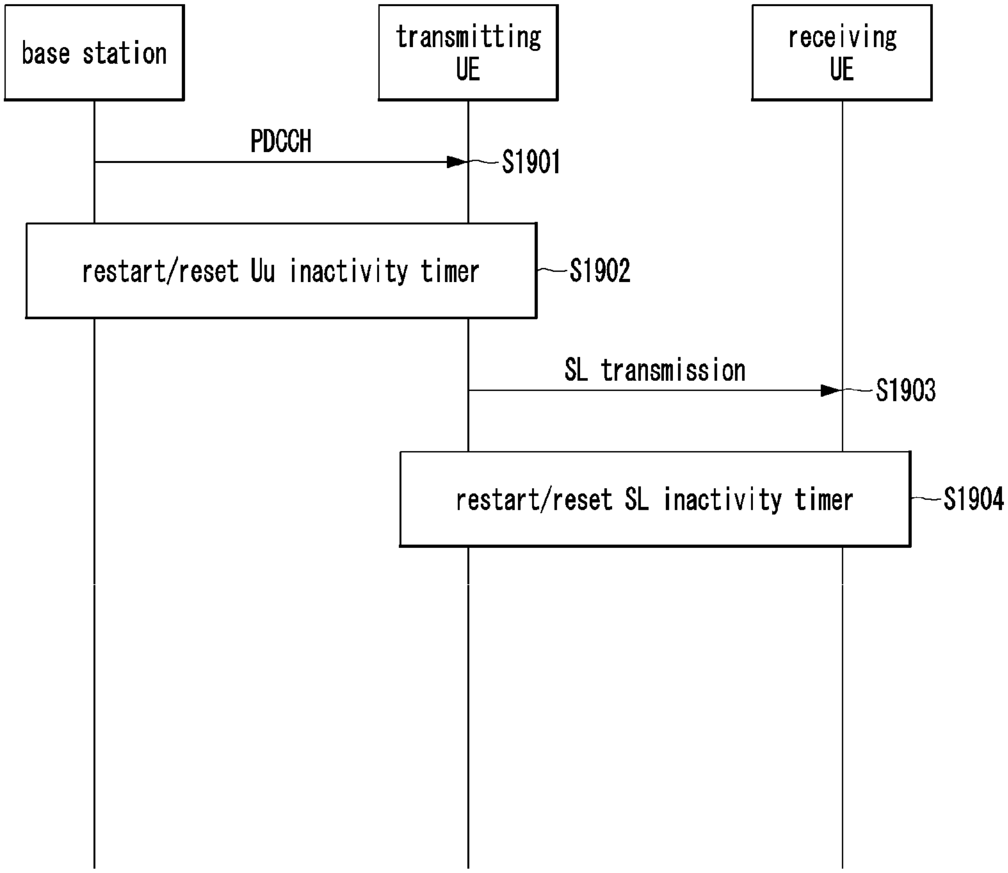
FIG. 19 is a sequence chart illustrating a first exemplary embodiment of a signaling method for synchronization of an inactivity timer.

FIG. 19 is a sequence chart illustrating a first exemplary embodiment of a signaling method for synchronization of an inactivity timer.

As shown in FIG. 19, a base station, transmitting UE, and receiving UE each may be the same as the base station, transmitting UE, and receiving UE shown in FIG. 18. In exemplary embodiments, signaling operations between the communication nodes may be performed based on at least one of higher layer signaling, MAC signaling, or PHY signaling. The base station may transmit a PDCCH (e.g. DCI format 3_x) for SL transmission to the transmitting UE (S1901). The PDCCH may include resource allocation information for the SL transmission. After the step S1901, a Uu inactivity timer for a Uu DRX operation between the base station and the transmitting UE may be restarted and/or reset (S1902).

The transmitting UE may perform the SL transmission based on the resource allocation information included in the PDCCH (S1903). In the step S1903, the transmitting UE may transmit information related to restarting/resetting the Uu inactivity timer to the receiving UE. The information related to restarting/resetting the Uu inactivity timer may be transmitted on a PSCCH and/or PSSCH. The information related to restarting/resetting the Uu inactivity timer may be included in an SCI and/or data unit. The information related to restarting/resetting the Uu inactivity timer may be included in a MAC CE. Alternatively, the information related to restarting/resetting the Uu inactivity timer may be transmitted by higher layer signaling.

The information related to restarting/resetting the Uu inactivity timer may include at least one of information indicating whether to restart the Uu inactivity timer, information indicating whether to reset the Uu inactivity timer, information on a processing time required for an SL transmission operation and/or SL reception operation after restarting the Uu inactivity timer, or information on a processing time required for an SL transmission operation and/or SL reception operation after resetting the Uu inactivity timer. The information related to restarting/resetting the Uu inactivity timer may be provided in form of a time offset. The information related to restarting/resetting the Uu inactivity timer may include information required for synchronization with the SL inactivity timer when the Uu inactivity timer is restarted and/or reset.

The receiving UE may receive an SL channel and/or signal from the transmitting UE. For example, the receiving UE may receive information related to restarting/resetting the Uu inactivity timer from the transmitting UE. Thereafter, the SL inactivity timer for the SL DRX operation between the transmitting UE and the receiving UE may be restarted and/or reset (S1904). The step S1904 may be performed based on the information related to restarting/resetting the Uu inactivity timer. According to the step S1904, the SL inactivity timer may be synchronized with the Uu inactivity timer.

The exemplary embodiment of FIG. 19 may be performed with DRX configuration information configured in each UE. When communication based on the RA mode 1 is performed, information on the DRX-related timer and/or information for synchronization of the DRX-related timer may be included in a signaling message. The signaling message may be the signaling message #1, signaling message #2, report of signaling message #1, report of signaling message #2, and/or DRX configuration information.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of a first user equipment (UE), the method comprising:

receiving, from a second UE, a signaling message #1 including second Uu discontinuous reception (DRX) configuration information for a second Uu link between the second UE and a second base station;

performing a reconfiguration operation of SL DRX configuration for a sidelink (SL) DRX operation for a first SL between the first UE and the second UE in consideration of the second Uu DRX configuration information, so that the SL DRX operation is aligned with the second Uu DRX operation for the second Uu link; and transmitting, to the second UE, a signaling message #2 including the reconfigured SL DRX configuration information, wherein a second SL between the first UE and a third UE is configured, and the reconfiguration operation of the SL DRX configuration is determined to be preferentially applied to the first SL among the first SL and the second SL, based on a priority of a resource allocation (RA) mode of each of the first SL and the second SL.

2. The method of claim 1, wherein the SL DRX configuration information is reconfigured in further consideration of first Uu DRX configuration information for a first Uu link between the first UE and a first base station together with the second Uu DRX configuration information, and the first Uu DRX configuration information is received from the first base station.

3. The method of claim 1, wherein the signaling message #2 further includes first Uu DRX configuration information for a first Uu link between the first UE and a first base station.

4. The method of claim 1, wherein the reconfiguring of the SL DRX configuration information is performed in response that the SL DRX operation and the second Uu DRX operation conflict.

5. The method of claim 1, wherein the SL DRX configuration information includes at least one of a DRX cycle, on-duration, or DRX-related timer.

6. The method of claim 1, wherein each of the signaling message #1 and the signaling message #2 is transmitted and received based on at least one of higher layer signaling, medium access control (MAC) signaling, or physical (PHY) signaling.

7. The method of claim 1, wherein the first UE is a transmitting UE that transmits SL data to the second UE, the second UE is a receiving UE that receives the SL data from the first UE, and communication on the first SL between the first UE and the second UE is performed based on resources allocated by a first base station to which the first UE is connected.

8. A method of a first user equipment (UE), the method comprising:

transmitting, to a third UE, a signaling message #1-A including first sidelink (SL) discontinuous reception (DRX) configuration information for a first SL between the first UE and a second UE;

receiving, from the third UE, a signaling message #2-A including second SL DRX configuration information reconfigured in consideration of the first SL DRX configuration information so that DRX operations are aligned; and transmitting, to the second UE, a signaling message #1-B including the reconfigured second SL DRX configuration information, wherein the reconfigured second SL DRX configuration information is applied to a second SL between the first UE and the third UE, and wherein among the first SL and the second SL, an SL on which the signaling message #1-A is preferentially transmitted is determined according to resource allocation (RA) modes applied to the first SL and the second SL.

9. The method of claim 8, wherein in response that a resource allocation (RA) mode 1 is applied to the first SL, an RA mode 2 is applied to the second SL, and a priority of the RA mode 2 is higher than a priority of the RA mode 1, or in response that the RA mode 2 is applied to the first SL, the RA mode 1 is applied to the second SL, and a priority of the RA mode 1 is higher than the priority of the RA mode 2, the signaling message #1-A is preferentially transmitted to the third UE through the second SL.

10. The method of claim 8, further comprising: receiving, from the second UE, a signaling message #2-B including the first SL DRX configuration information reconfigured in consideration of the reconfigured second SL DRX configuration information so that the DRX operations are aligned.

11. The method of claim 8, wherein the signaling message #1-A is used to trigger an alignment procedure of the DRX operations.

12. The method of claim 8, wherein the first UE is a receiving UE that receives SL data from each of the second UE and the third UE, and each of the second UE and the third UE is a transmitting UE that transmits the SL data to the first UE.

13. A method of a first user equipment (UE), the method comprising:

transmitting, to a third UE, a signaling message #1-A including first sidelink (SL) discontinuous reception (DRX) configuration information for a first SL between the first UE and a second UE;

receiving, from the third UE, a signaling message #2-A including second SL DRX configuration information reconfigured in consideration of the first SL DRX configuration information so that DRX operations are aligned;

reconfiguring the first SL DRX configuration information in consideration of the reconfigured second SL DRX configuration information, so that the DRX operations are aligned; and transmitting, to the second UE, a signaling message #2-B including the reconfigured first SL DRX configuration information, wherein the reconfigured second SL DRX configuration information is applied to a second SL between the first UE and the third UE, and wherein reconfigured SL DRX configuration information to be preferentially applied between the reconfigured first SL DRX configuration information and the reconfigured second SL DRX configuration information is determined based on a priority of a resource allocation (RA) mode of each of the first SL and the second SL.

14. The method of claim 13, wherein the first UE operates as a transmitting UE that transmits SL data to the second UE, the first UE operates as a receiving UE that receives the SL data from the third UE, the second UE is a receiving UE that receives the SL data from the first UE, and the third UE is a transmitting UE that transmits the SL data to the first UE.

15. The method of claim 13, wherein the second SL DRX configuration information is reconfigured in further consideration of Uu DRX configuration information for a Uu link between the third UE and a base station together with the first SL DRX configuration information.

16. The method of claim 13, wherein each of the first SL DRX configuration information, the reconfigured first SL DRX configuration information, and the reconfigured second SL DRX configuration information includes at least one of a DRX cycle, on-duration, or DRX-related timer.

17. The method of claim 13, wherein the reconfiguring of the first SL DRX configuration information is performed in response that a first SL DRX operation on the first SL and a second SL DRX operation on the second SL conflict.

18. The method of claim 13, wherein the signaling message #1-A is used to trigger an alignment procedure of the DRX operations.

19. The method of claim 13, wherein each of the signaling message #1-A, the signaling message #2-A, and the signaling message #2-B is transmitted and received based on at least one of higher layer signaling, medium access control (MAC) signaling, or physical (PHY) signaling.

* * * * *